[19] 
US009424646B2

(12) United States Patent
Ikeda et al.

(10) Patent No.: US 9,424,646 B2
(45) Date of Patent: Aug. 23, 2016

(54) CONTROL SYSTEM AND CONTROL METHOD

(71) Applicant: OMRON Corporation, Kyoto-shi, Kyoto (JP)

(72) Inventors: Yasuyuki Ikeda, Kyoto (JP); Kazushi Yoshioka, Kusatsu (JP); Yutaka Kato, Kyotanabe (JP); Yuichi Doi, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 99 days.

(21) Appl. No.: 14/246,271

(22) Filed: Apr. 7, 2014

(65) Prior Publication Data

US 2014/0301632 A1 Oct. 9, 2014

(30) Foreign Application Priority Data

Apr. 8, 2013 (JP) .................. 2013-080774

(51) Int. Cl.
G06K 9/00 (2006.01)
G06T 7/00 (2006.01)
B25J 9/16 (2006.01)
G06K 9/32 (2006.01)

(52) U.S. Cl.
CPC ............. *G06T 7/004* (2013.01); *B25J 9/1697* (2013.01); *G06K 9/3216* (2013.01); *G06T 7/0004* (2013.01); *G05B 2219/37553* (2013.01); *G05B 2219/41106* (2013.01); *G06K 2009/3225* (2013.01); *G06K 2209/19* (2013.01); *G06T 2207/30164* (2013.01)

(58) Field of Classification Search
None
See application file for complete search history.

(56) References Cited

U.S. PATENT DOCUMENTS 4,209,853 A 6/1980 Hyatt
4,641,071 A 2/1987 Tazawa et al.
(Continued)

FOREIGN PATENT DOCUMENTS

| JP | H11-073225 A | 3/1999 |
| JP | 2000-180810 A | 6/2000 |
| JP | 2006-049755 A | 2/2006 |
| JP | 2007-011611 A | 1/2007 |

OTHER PUBLICATIONS

Korean office action letter issued on May 20, 2015 in the counterpart Korean patent application.
(Continued)

*Primary Examiner* — Chan Park
*Assistant Examiner* — Elisa Rice
(74) *Attorney, Agent, or Firm* — Mots Law, PLLC

(57) ABSTRACT

A control system executes a first control operation, and then executes a second control operation. In the first control operation, the image processing section obtains the image data and specifies a position of a characteristic part. The control section determines a control instruction for accelerating an object to a predetermined first speed based on the specified position of the characteristic part and then decelerating the object to a predetermined second speed lower than the first speed, to move the object to an intermediate target position away from the final target position by a predetermined margin distance. In the second control operation, the image processing section obtains the image data during movement of the moving mechanism and specifies the position of the characteristic part, and the control section determines a control instruction for positioning the object to the final target position based on the specified position of the characteristic part.

13 Claims, 23 Drawing Sheets

(56) References Cited

U.S. PATENT DOCUMENTS

| | | | |
|---|---|---|---|
| 7,580,558 B2 * | 8/2009 | McEvoy | B41F 15/0818 348/125 |
| 2003/0144809 A1 | 7/2003 | Puchtler | |
| 2007/0001010 A1 | 1/2007 | Yamane | |
| 2011/0106311 A1 | 5/2011 | Nakajima et al. | |

OTHER PUBLICATIONS

Yasser H. Anis, James K Mills, William L. Cleghorn: "Visual-servoing of a six-degree-of-freedom robotic manipulator for automated microassembly task execution", J. Micro/Nanolith. MEMS MOEMS, vol. 7, No. 3, Jul. 31, 2008, XP040447208.

* cited by examiner

FIG. 8

| Variable name | Variable details | |
|---|---|---|
| $\alpha$ | System allowable maximum acceleration | Specifications of system components |
| dmax | Total movement amount (Visual field sizes) | |
| f | Alignment control cycle | |
| R | Required accuracy | Determined from system request |
| res | Resolution of required accuracy | |
| dns | Non-stop alignment start distance | |
| Vsys_max | System allowable maximum speed | Specifications of stage |
| Vns_max | Maximum speed in non-stop alignment | |
| d1 | Movement distance in time t1 | |
| d2 | Movement distance in time t2 | |
| d3 | Movement distance in time t3 | |
| d4 | Movement distance in time t4 | |
| d5 | Movement distance in time t5 | |

FIG. 9

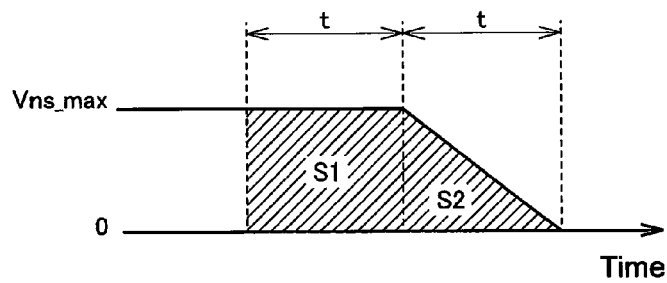

◌ First sampling point
○ Second sampling point
✕ Rotation center

CONTROL SYSTEM AND CONTROL METHOD

BACKGROUND

1. Field

The present invention relates to a control system and a control method for positioning an object by using image processing.

2. Related Art

Conventionally, various automated techniques are being developed in manufacturing sites. As one of such automated techniques, an automatic control technique using image processing is known.

For example, JP 2000-180810 A (Patent Document 1) discloses, in a device for manufacturing a liquid crystal display cell assembled by positioning and overlapping a pair of transparent substrates each provided with a mark for positioning, a configuration of correcting and controlling a table carrying position (teaching position) of any of an upper substrate robot and a lower substrate robot by an amount of a positional deviation between the upper and lower transparent substrates.

In P. Panikopoulos and Khosla P. K., "Adaptive robotic visual tracking", Theory and experiments, IEEE Transactions on Automatic Control, 38(3): 429-445, March 1993, there is disclosed an adaptive control scheme in which an image processing technique is applied in a robotics system.

With respect to positioning of a workpiece, JP 2006-049755 A (Patent Document 2) discloses a method of improving accuracy of positioning of a workpiece by obtaining the rotation center of a stage with high accuracy by a simple method.

However, in a manufacturing site, a demand for higher speed and higher accuracy is increasing more and more. The above-described prior art cannot address such a demand. Specifically, the positioning technique disclosed in Patent Document 1 cannot address the demand for higher speed since repetitive positioning is required. In the method disclosed in Non-patent Document 1, it is necessary to suppress moving speed to increase accuracy, and it is generally difficult to address the demand for higher speed.

Consequently, it is requested to realize positioning using image processing at higher speed and with higher accuracy.

SUMMARY

A control system according to an aspect of the present invention includes: an image processing section configured to obtain image data obtained by imaging an object provided with a characteristic part for positioning and specify a position of the characteristic part included in the image data; and a control section configured to position the object to a predetermined final target position by giving a control instruction based on the specified position of the characteristic part to a moving mechanism which changes the position of the object. The control system executes a first control operation, and then executes a second control operation. In the first control operation, the image processing section obtains the image data and specifies the position of the characteristic part, the control section determines a control instruction for accelerating the object to a predetermined first speed based on the specified position of the characteristic part and then decelerating the object to a predetermined second speed lower than the first speed, to move the object to an intermediate target position away from the final target position by a predetermined margin distance. In the second control operation, the image processing section obtains the image data during movement of the moving mechanism and specifies the position of the characteristic part, and the control section determines a control instruction for positioning the object to the final target position based on the specified position of the characteristic part. The margin distance is determined such that the object does not pass the final target position when the speed of the moving mechanism is decreased from the second speed at an allowable maximum acceleration.

Preferably, in the second control operation, the control system repeatedly executes specification of the position of the characteristic part by the image processing section and determination of the control instruction for positioning the object to the final target position by the control section.

Preferably, the margin distance is a larger value between a first distance and a second distance. The first distance is determined by comparing a result obtained by the image processing section with a predetermined movement amount, the result obtained by specifying the position of the object after the moving mechanism's predetermined movement. The second distance is a movement amount of the moving mechanism during a period in which the moving mechanism is moved at the second speed after the image processing section obtains image data and until the image processing section specifies the position of the characteristic part, and until the moving mechanism is decelerated from the second speed at the allowable maximum acceleration to be stopped.

Preferably, the control instruction in the first control operation includes an instruction of accelerating the moving mechanism at the allowable maximum acceleration.

Preferably, in the second control operation, in a case where specification of the position of the characteristic part by the image processing section is not normal, the control section skips determination of the control instruction.

Preferably, the image processing section is configured to obtain image data from first and second cameras having different visual field sizes from each other. The control section determines the control instruction used in the first control operation based on the image data of the first camera having a larger visual field size, and in the first control operation, during movement of the moving mechanism, the control section switches the camera from which the image data is obtained from the first camera to the second camera having a smaller visual field size.

Preferably, in the second control operation, in a case where specification of the position of the characteristic part is not normal, the image processing section skips determination of the control instruction.

Preferably, the image processing section is configured to obtain image data from each of first and second cameras having different visual field sizes from each other. The image processing section determines the control instruction used in the first control operation based on image data from the first camera having a larger visual field size, and in the first control operation, during movement of the moving mechanism, the image processing section switches the camera from which the image data is obtained from the first camera to the second camera having a smaller visual field size.

Preferably, the moving mechanism further has a different movable coordinate system in addition to a coordinate system positioned in accordance with the first and second control operations. The control section corrects a control instruction in the second control operation in accordance with an error which occurs when the moving mechanism moves in the different coordinate system.

A control method according to another aspect of the present invention includes the steps of obtaining image data obtained by imaging an object provided with a characteristic part for positioning and specifying a position of the characteristic part included in the image data; and positioning the object to a predetermined final target position by giving a control instruction based on the specified position of the characteristic part to a moving mechanism which changes the position of the object. In the control method, a first control operation is executed, and then a second control operation is executed. In the first control operation, after the step of obtaining the image data and specifying the position of the characteristic part is executed, the positioning step includes a step of accelerating the object to a predetermined first speed based on the specified position of the characteristic part and then decelerating the object to a predetermined second speed lower than the first speed, to move the object to an intermediate target position away from the final target position by a predetermined margin distance. In the second control operation, after executing the step of obtaining the image data during movement of the moving mechanism and specifying the position of the characteristic part, the positioning step includes a step of positioning the object to the final target position based on the specified position of the characteristic part. The margin distance is determined such that the object does not pass the final target position when the speed of the moving mechanism is decreased from the second speed at an allowable maximum acceleration.

Preferably, the positioning step includes a step of switching the first control operation to the second control operation when a distance between the object and a target location becomes equal to or less than a distance according to an error which occurs in a position specified from the image data. The control method further includes the steps of: moving the moving mechanism by a predetermined movement amount; specifying a position from image data obtained by imaging the position of the object after the movement; and moving the moving mechanism a plurality of times and determining a distance according to the error in accordance with comparison between the predetermined movement amount and the specified position of the object.

According to the present invention, positioning using image processing can be performed at higher speed and higher accuracy.

BRIEF DESCRIPTION OF THE DRAWINGS

FIG. 8 is a diagram illustrating system parameters for executing the alignment according to the embodiment;

FIG. 9 is a diagram for describing a method of determining a non-stop alignment allowable maximum speed Vns_max used for the alignment according to the embodiment;

DETAILED DESCRIPTION

Figure 1:
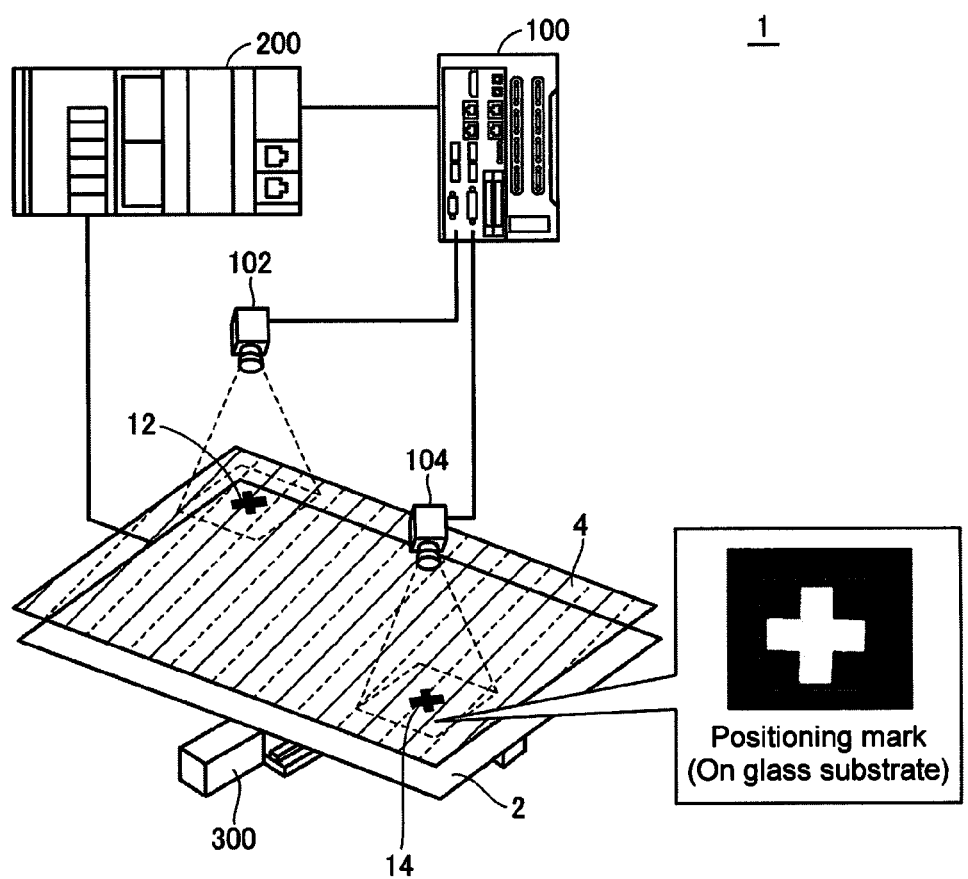
FIG. 1 is a schematic diagram illustrating an overall configuration of a control system according to an embodiment.

An embodiment of the present invention will be described in detail with reference to the drawings. Note that the same reference numeral is denoted to the same or corresponding part in the drawings and a description thereof will not be repeated.

A. Application Example

First, an application example of a control system according to the embodiment will be described. FIG. 1 is a schematic diagram illustrating an overall configuration of control system 1 according to the embodiment. Control system 1 illustrated in FIG. 1 performs alignment by using image processing. The alignment typically refers to a process of disposing an object (hereinafter, also referred to as a "workpiece") in a right position in a production line in a manufacturing process of an industrial product or the like. As an example of such alignment, control system 1 controls positioning of glass substrate 2 to exposure mask 4 before a baking process (exposing process) of a circuit pattern on a glass substrate in a production line of a liquid crystal panel. The workpiece is provided with positioning marks 12 and 14 as characteristic parts for positioning in predetermined positions. In control system 1, accurate positioning is realized by imaging positioning marks 12 and 14 which are preliminarily provided on the glass substrate and performing image processing on the obtained image.

Control system 1 includes image processing device 100, motion controller 200, and stage 300. Image processing device 100 obtains image data imaged by one or more cameras (in the example of FIG. 1, cameras 102 and 104), and specifies the position of glass substrate 2 as the workpiece from the positions of positioning marks 12 and 14 included in the obtained image data. Based on the specified position of glass substrate 2, an instruction for disposing glass substrate 2 to the right position is output to motion controller 200. That is, image processing device 100 corresponding to an image processing section obtains image data obtained by imaging the object provided with the characteristic parts in predetermined positions and specifies the positions of the characteristic parts included in the image data.

Motion controller 200 realizes alignment of glass substrate 2 by giving an instruction to stage 300 in accordance with the instruction from image processing device 100. That is, motion controller 200 corresponding to a control section positions the object to a predetermined final target position by giving a control instruction based on the positions of the specified characteristic parts to a moving mechanism which changes the position of the object.

Stage 300 may have any degree of freedom as long as it is a mechanism capable of disposing glass substrate 2 as a workpiece to the right position. In the embodiment, stage 300 can provide displacement in the horizontal direction and displacement in rotation to glass substrate 2. That is, glass substrate 2 can be moved in each of X and Y directions and glass substrate 2 can be rotated around a predetermined rotation shaft. As such control on stage 300, first, glass substrate 2 is moved to the target location in the horizontal direction (hereinafter, also referred to as "XY movement"), and then glass substrate 2 is rotated as necessary.

B. Device Configuration

Next, the configuration of the device in control system 1 according to the embodiment will be described.

b1: Image Processing Device 100

Figure 2:
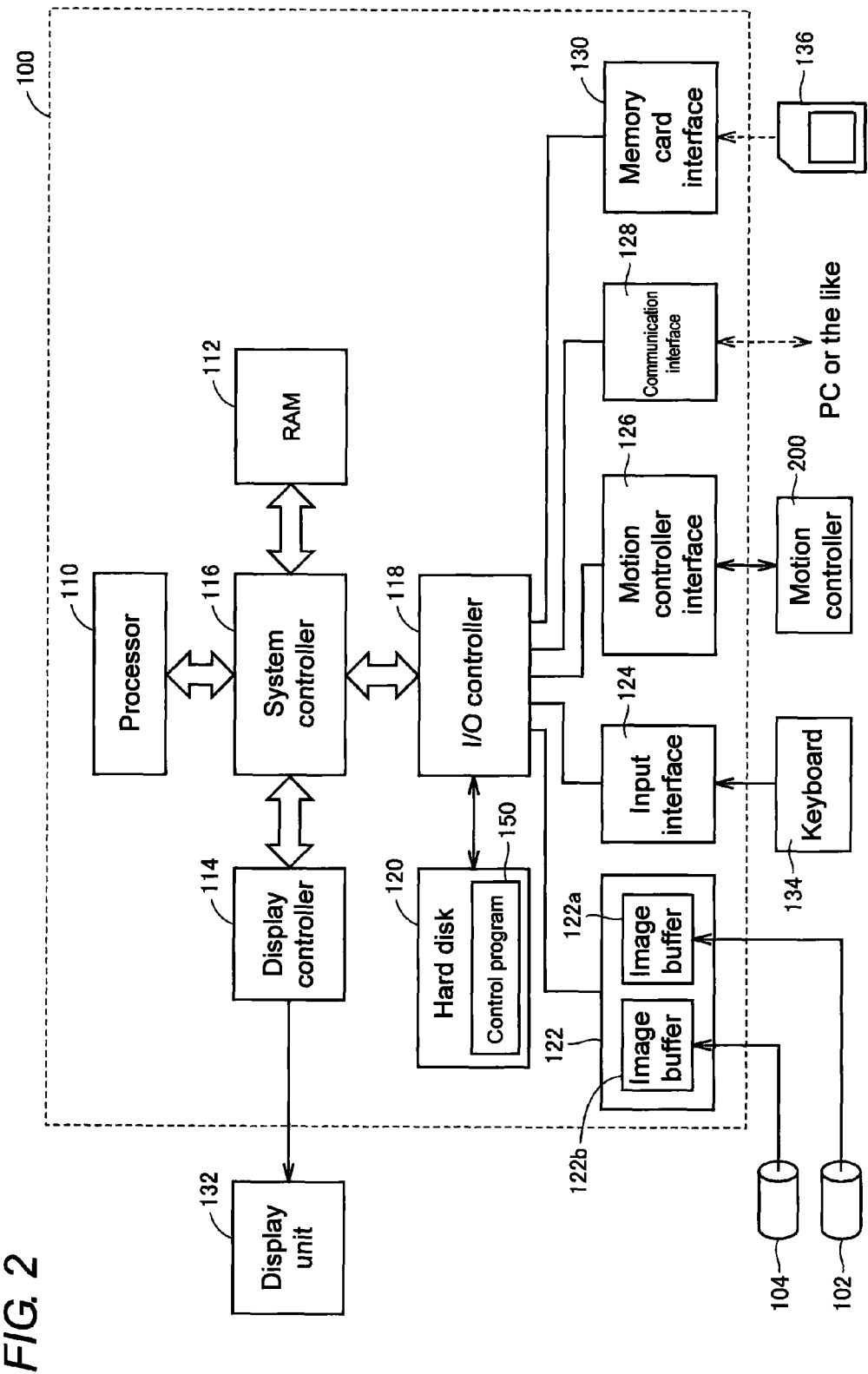
FIG. 2 is a schematic diagram illustrating a hardware configuration of an image processing device in the control system according to the embodiment.

FIG. 2 is a schematic diagram illustrating a hardware configuration of image processing device 100 in control system 1 according to the embodiment. Referring to FIG. 2, image processing device 100 typically has a structure according to general computer architecture, and realizes various types of image processing, which will be described later, by executing a pre-installed program by a processor.

More specifically, image processing device 100 includes processor 110 such as a CPU (Central Processing Unit) and an MPU (Micro-Processing Unit), RAM (Random Access Memory) 112, display controller 114, system controller 116, I/O (Input/Output) controller 118, hard disk 120, camera interface 122, input interface 124, motion controller interface 126, communication interface 128, and memory card interface 130. The components are connected to one another so as to transmit/receive data using system controller 116.

Processor 110 exchanges programs (codes) and the like with system controller 116 and executes them in a predetermined order, thereby realizing a target arithmetic processing.

System controller 116 is connected to each of processor 110, RAM 112, display controller 114, and I/O controller 118 via a bus, transmits/receives data to/from the components, and controls overall processes of image processing device 100.

RAM 112 is typically a volatile storage device such as a DRAM (Dynamic Random Access Memory) and holds a program read from hard disk 120, camera images (image data) obtained by cameras 102 and 104, results of processing on the camera images, workpiece data, and the like.

Display controller 114 is connected to display unit 132 and outputs a signal for displaying various types of information to display unit 132 in accordance with an internal command from system controller 116.

I/O controller 118 controls data exchange with a recording medium and an external device which are connected to image processing device 100. More specifically, I/O controller 118 is connected to hard disk 120, camera interface 122, input interface 124, motion controller interface 126, communication interface 128, and memory card interface 130.

Hard disk 120 is typically a nonvolatile magnetic storage device and stores various setting values and the like in addition to control program 150 to be executed by processor 110. Control program 150 installed in hard disk 120 is distributed in a state of being stored in memory card 136 or the like. In place of hard disk 120, a semiconductor storage device such as a flash memory or an optical storage device such as a DVD-RAM (Digital Versatile Disk Random Access Memory) may be employed.

Camera interface 122 corresponds to an input unit which receives image data generated by imaging the workpiece and mediates data transfer between processor 110 and cameras 102 and 104. Camera interface 122 includes image buffers 122a and 122b for temporarily storing image data from cameras 102 and 104. Although a single image buffer which can be shared by cameras may be provided for a plurality of cameras, it is preferable to independently dispose a plurality of image buffers so as to be dedicated to the respective cameras to achieve higher processing speed.

Input interface 124 mediates data transfer between processor 110 and input devices such as keyboard 134, a mouse, a touch panel, and a dedicated console.

Motion controller interface 126 mediates data transfer between processor 110 and motion controller 200.

Communication interface 128 mediates data transfer between processor 110 and other personal computer, server device, and the like, which are not illustrated. Communication interface 128 is typically Ethernet (registered trademark), USB (Universal Serial Bus), or the like.

Memory card interface 130 mediates data transfer between processor 110 and memory card 136 as a recording medium. Memory card 136 is distributed in a state of storing control program 150 or the like executed by image processing device 100, and memory card interface 130 reads the control program from memory card 136. Memory card 136 is a general semiconductor storage device such as SD (Secure Digital), a magnetic recording medium such as flexible disk, an optical recording medium such as a CD-ROM (Compact Disk Read Only Memory), or the like. Alternatively, a program downloaded from a distribution server or the like may be installed in image processing device 100 via communication interface 128.

In the case of using a computer having a structure according to the general computer architecture as described above, in addition to an application for providing the functions according to the embodiment, an OS (Operating System) for providing basic functions of a computer may be installed. In this case, the control program according to the embodiment may execute the processing by calling a necessary module in program modules provided as a part of the OS in a predetermined order and/or timing.

Further, the control program according to the embodiment may be provided so as to be incorporated in a part of another program. In this case as well, the program itself does not include a module included in another program which is combined as described above, and processing is executed in cooperation with the another program. That is, the control program according to the embodiment may be incorporated in another program.

Alternatively, a part or all of the functions provided by execution of the control program may be mounted as a dedicated hardware circuit.

b2: Motion Controller 200

Figure 3:
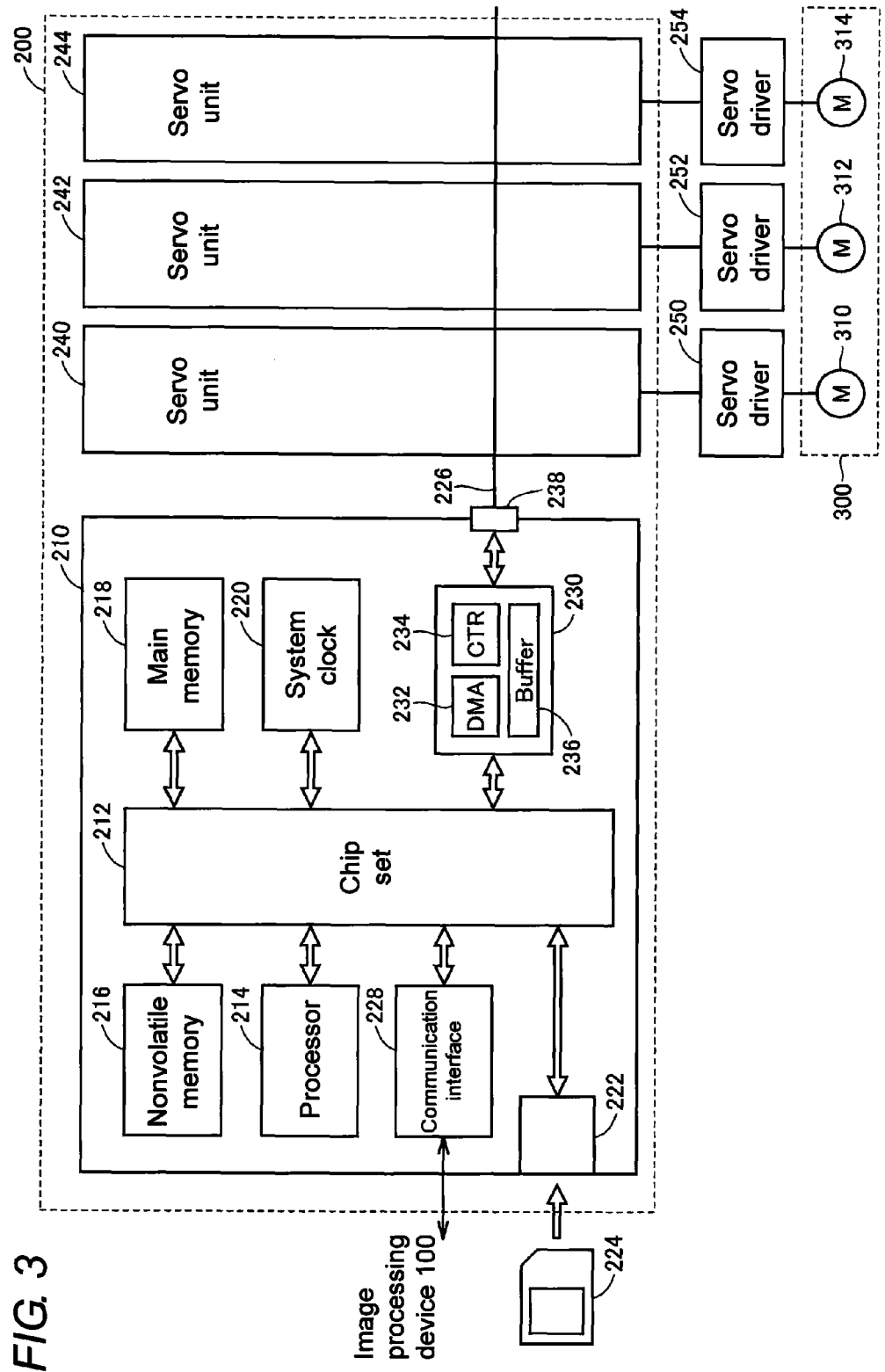
FIG. 3 is a schematic diagram illustrating a hardware configuration of a motion controller in the control system according to the embodiment.

FIG. 3 is a schematic diagram illustrating a hardware configuration of motion controller 200 in control system 1 according to the embodiment. Referring to FIG. 3, motion controller 200 includes main control unit 210 and a plurality of servo units 240, 242, and 244. In control system 1 according to the embodiment, for example, stage 300 has servo motors 310, 312, and 314 of three axes, and servo units 240, 242, and 244 corresponding to the number of axes are included in motion controller 200.

Main control unit 210 performs overall control of motion controller 200. Main control unit 210 is connected to servo units 240, 242, and 244 via internal bus 226 and transmits/receives data thereto/therefrom. Servo units 240, 242, and 244 output a control command (typically, a drive pulse or the like) to servo drivers 250, 252, and 254 in accordance with an internal instruction or the like from main control unit 210. Servo drivers 250, 252, and 254 drive servo motors 310, 312, and 314 to which they are connected, respectively.

Main control unit 210 includes chip set 212, processor 214, nonvolatile memory 216, main memory 218, system clock 220, memory card interface 222, communication interface 228, and internal bus controller 230. Chip set 212 and the other components are coupled to one another via various buses.

Processor 214 and chip set 212 typically have a configuration according to general computer architecture. That is, processor 214 interprets and executes an instruction code sequentially supplied according to the internal clock from chip set 212. Chip set 212 transmits/receives internal data to/from the various connected components and generates an instruction code necessary for processor 214. System clock 220 generates system clocks of predetermined cycles and provides generated system clocks to processor 214. Chip set 212 has the function of caching data or the like obtained as a result of execution of the arithmetic processing in processor 214.

Main control unit 210 has, as storage sections, nonvolatile memory 216 and main memory 218. Nonvolatile memory 216 holds an OS, a system program, a user program, data definition information, log information, and the like in a non-volatile manner. Main memory 218 is a volatile storage region, holds various programs to be executed in processor 214, and is also used as a work memory at the time of executing the various programs.

Main control unit 210 has, as communication sections, communication interface 228 and internal bus controller 230. These communication circuits transmit and receive data.

Communication interface 228 transmits/receives data to/from image processing device 100.

Internal bus controller 230 transmits/receives data via internal bus 226. More specifically, internal bus controller 230 includes buffer memory 236, DMA (Dynamic Memory Access) control circuit 232, and internal bus control circuit 234.

Memory card interface 222 connects memory card 224 being detachable from main control unit 210 to processor 214.

C. Related Techniques

Next, to facilitate understanding of a control method related to the alignment according to the embodiment, related techniques of the present invention will be described.

c1: Repetitive Positioning (Related Technique No. 1)

In the alignment in the application example as illustrated in FIG. 1, high positional accuracy is required. Consequently, there is a case where required accuracy is not satisfied by one movement. This is mainly caused by a measurement error in the image processing due to a calibration error, noise of the camera, or the like. Consequently, as disclosed in Patent Document 1, a method for increasing positional accuracy by repeating position measurement and movement a few times can be employed.

Figure 4:
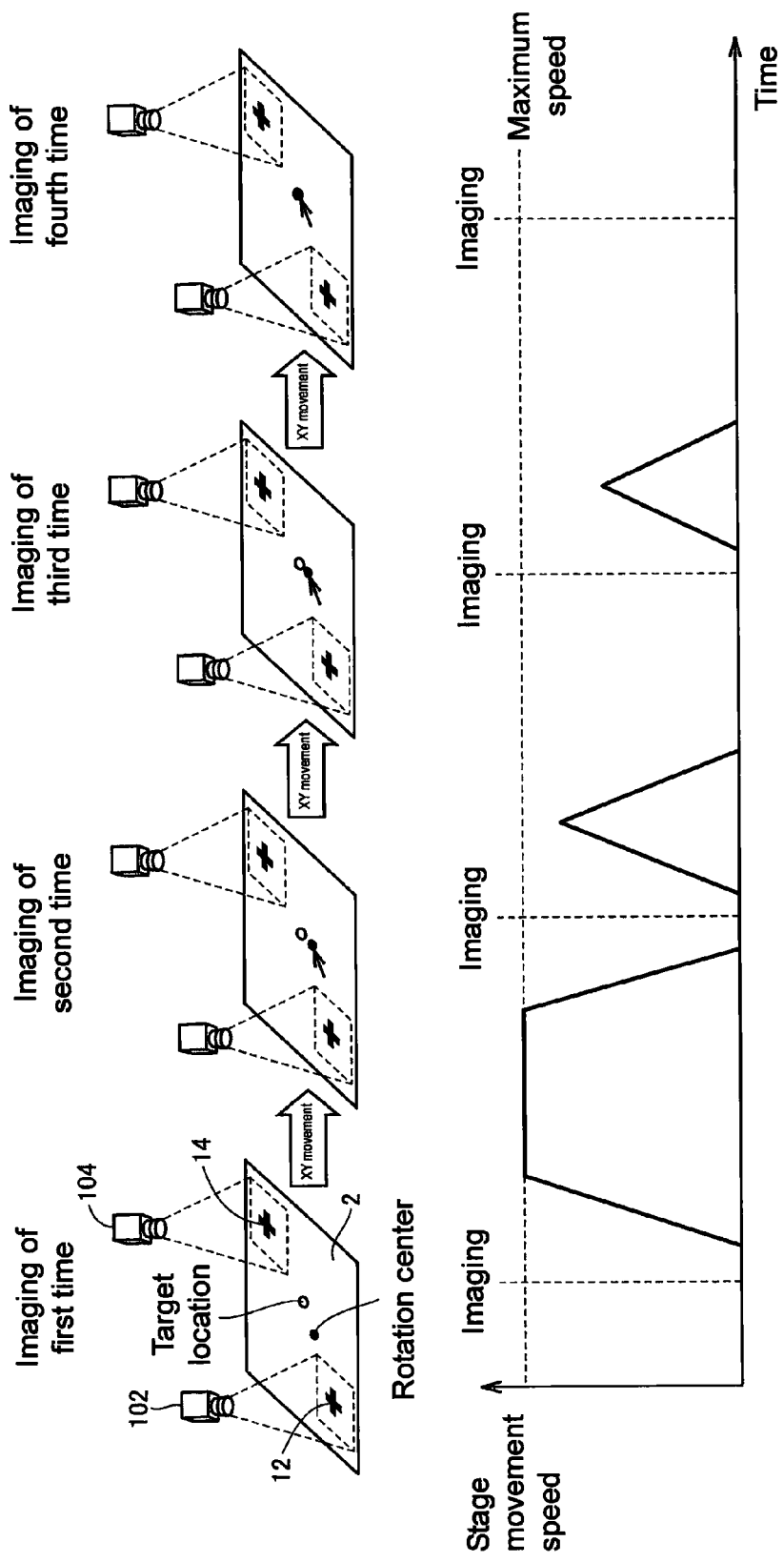
FIG. 4 is a diagram for describing alignment for repetitive positioning according to a related technique of the embodiment.

FIG. 4 is a diagram for describing alignment for repetitive positioning according to a related technique of the embodiment. As illustrated in FIG. 4, first, imaging is performed, the difference (vector amount) to a target location of a workpiece is calculated, and a motion in XY movement for the workpiece is determined and executed (imaging of the first time). The motion in the XY movement, typically, accelerates at a predetermined acceleration, and then maintains the predetermined acceleration (basically, allowable maximum speed of the system). Thereafter, the motion decelerates at predetermined deceleration speed and stops. At the stop time point, imaging is performed again, and the difference to the target location of the workpiece is calculated again. When the workpiece has not reached a position within a predetermined allowable error range from the target location, the motion in XY movement for the workpiece is determined again and re-executed (imaging of the second time).

Subsequently, a series of process cycles of imaging, calculation of the difference to the target location, movement, and stop is repeated until the error becomes equal to or less than a predetermined value. That is, the processes of imaging, acceleration, deceleration, and stop are repeated until the workpiece reaches the target location, so that a waste is generated in the movement time as a whole by the time required for acceleration and deceleration. In the case of temporarily stopping the motion, stabilization time (setting time) until vibration of the entire device is eliminated is necessary. Also in this point, the movement time as a whole becomes longer.

To shorten the movement time, it is requested that the workpiece reaches the target location by the series of movements without stopping stage 300.

c2: Non-Stop Alignment (Related Technique No. 2)

A "visual servo" is known as a method of performing positioning without stopping the driving mechanism of the device. The "visual servo" is a method of continuously imaging a moving workpiece by a camera, and momentarily adjusting the direction and speed of the motion of the workpiece from the result of the image processing. As disclosed in Non-patent Document 1, studies are being carried out in the field of control of a robot and the like.

Such a technique of "visual servo" can be applied to the alignment as described above. In such an alignment method, it is unnecessary to stop stage 300 for position measurement until the workpiece reaches the target location as illustrated in FIG. 4. Visual servo will be hereinafter referred to as "non-stop alignment" or "NSA".

Figure 5:
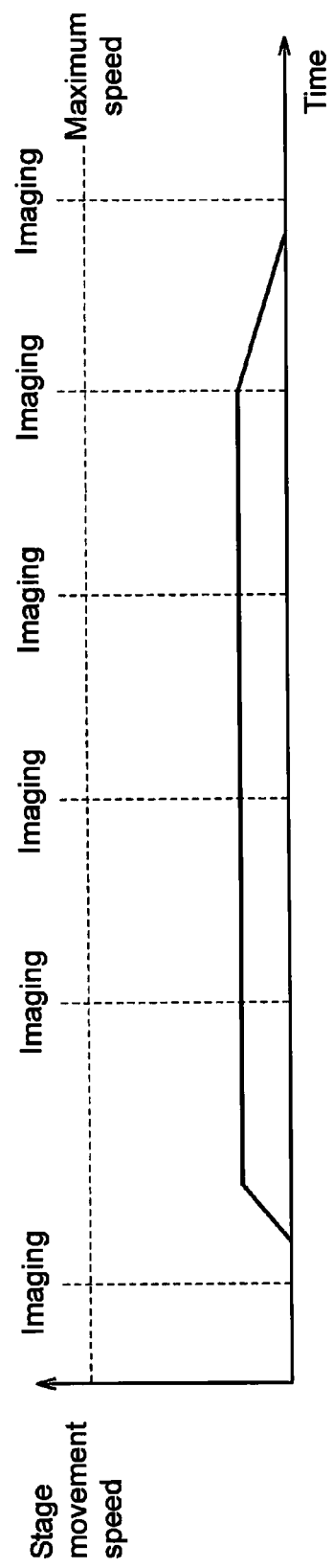
FIG. 5 is a diagram for describing non-stop alignment according to a related technique of the embodiment.

FIG. 5 is a diagram for describing non-stop alignment according to a related technique of the embodiment. As illustrated in FIG. 5, first, imaging is performed, the difference to the target location of the workpiece is calculated, and the motion in the XY movement for the workpiece is determined and executed. Subsequently, imaging is performed again during movement of stage 300, the difference to the target location of the workpiece is calculated, and the motion is corrected. That is, the motion (such as target path, speed pattern, acceleration pattern, or the like) determined according to a result of the preceding imaging is corrected in accordance with the result of the new imaging. By continuously repeating the imaging and correction of the motion, the workpiece is moved to the target location.

However, in the non-stop alignment, the table is not stopped. Therefore, in movement from an initial location to a target location, a workpiece needs to be controlled so as not to pass the target location. When the workpiece passes the target location, movement in the direction opposite to the direction of the immediately preceding movement, and a moving mechanism needs to be reversed. By the reverse operation of the moving mechanism, there is the possibility that backlash occurs and the moving mechanism is damaged by the inertia moment.

Consequently, it is necessary to accurately adjust the motion of the workpiece so that the workpiece reaches the target location with high accuracy. To realize this, the workpiece needs to be controlled at a moving speed much lower than the allowable maximum speed of the system. As a result, there is a case where time required for the movement as a whole cannot be shortened or becomes longer.

D. Outline of Alignment According to Embodiment

The alignment according to the embodiment aims at minimizing required time from start to end of alignment as compared with that in the related techniques as described above. As a specific method, at the initial stage of the alignment, when a workpiece approaches the target location at the allowable maximum speed of the system and reaches a certain range from the target location, the alignment is switched to the above-described non-stop alignment and the workpiece reaches the target location. That is, the alignment according to the embodiment is a method of combination of normal alignment in which the moving speed can be increased and non-stop alignment in which positioning to the target location can be performed without stopping stage 300. Without stopping the motion of stage 300, time required for the movement as a whole can be minimized by switching between the normal alignment and the non-stop alignment.

Figure 6:
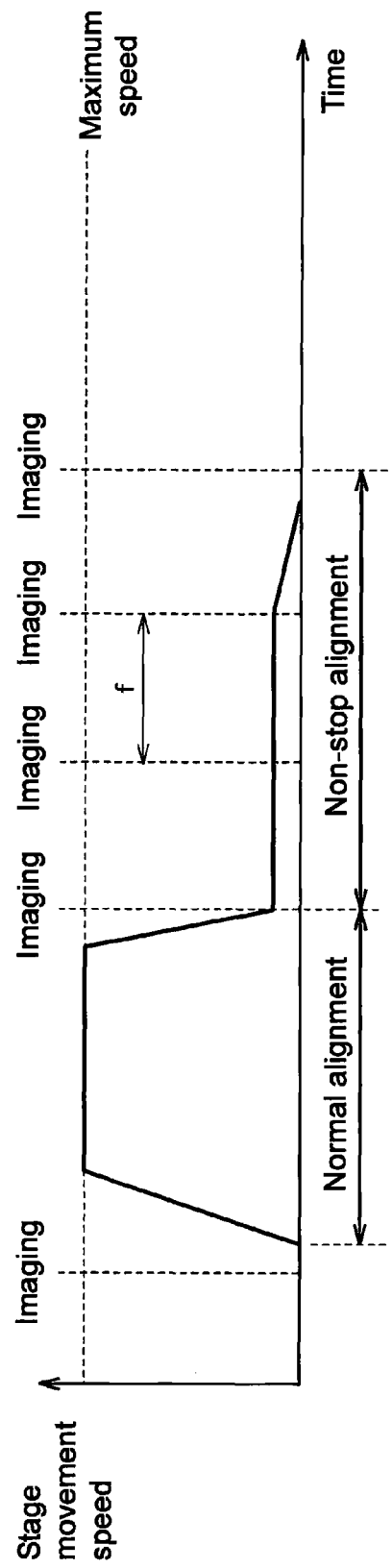
FIG. 6 is a diagram for describing alignment related to the embodiment.

FIG. 6 is a diagram for describing alignment according to the embodiment. As illustrated in FIG. 6, first, imaging is performed, the difference (vector amount) to the target location of the workpiece is calculated, and the motion in the XY movement for the workpiece is determined and executed (imaging of the first time). That is, the first target location is determined by the imaging of the first time, and stage 300 is moved at the allowable maximum speed of the system toward the determined target location (intermediate target position). When stage 300 reaches a position away from the target location by a certain distance, deceleration of stage 300 is started. The speed pattern of stage 300 illustrated in FIG. 6 may be determined first according to the result of the imaging of the first time. That is, the position of the deceleration start (or lapse time) of stage 300 may be determined in advance.

Thereafter, when the speed of stage 300 is decreased to a predetermined speed, the non-stop alignment is started, the imaging and the motion correction are continuously repeated until the error becomes a value within a predetermined range, and the workpiece is moved to the target location. At this time, imaging is executed in a non-stop alignment control cycle "f". In the case where stage 300 is sufficiently close to the target location, stage 300 can reach the target location by one imaging.

By combining the normal alignment and the non-stop alignment, time required to position the workpiece to the target location can be shortened. That is, control system 1 according to the embodiment executes a first control operation (normal alignment), and then executes a second control operation (non-stop alignment). In the first control operation, an image processing section (image processing device 100) obtains image data and specifies the position of a characteristic part. A control section (motion controller 200) determines a control instruction for accelerating an object to a predetermined first speed based on the specified position of the characteristic part and then decelerating the speed to a predetermined second speed lower than the first speed, to move the object to an intermediate target position away from a final target position by a predetermined margin distance. In the second control operation, the image processing section (image processing device 100) obtains image data during movement of a moving mechanism and specifies the position of the characteristic part. The control section (motion controller 200) determines a control instruction for positioning the object to a final target position based on the specified position of the characteristic part. At this time, the margin distance is determined such that the object does not pass the final target position when the speed of the moving mechanism is decreased from the second speed at the allowable maximum acceleration.

In many cases, in the second control operation, control system 1 repeatedly executes specification of the position of the characteristic part by the image processing section (image processing device 100) and determination of a control instruction for positioning the object to the final target position by the control section (motion controller 200).

The imaging and measurement of the first time in the second control operation may be executed before reaching the intermediate target position (for example, during deceleration from first speed to second speed).

E. Setting of Alignment According to Embodiment

Next, settings for executing the alignment according to the embodiment will be described.

Figure 7:
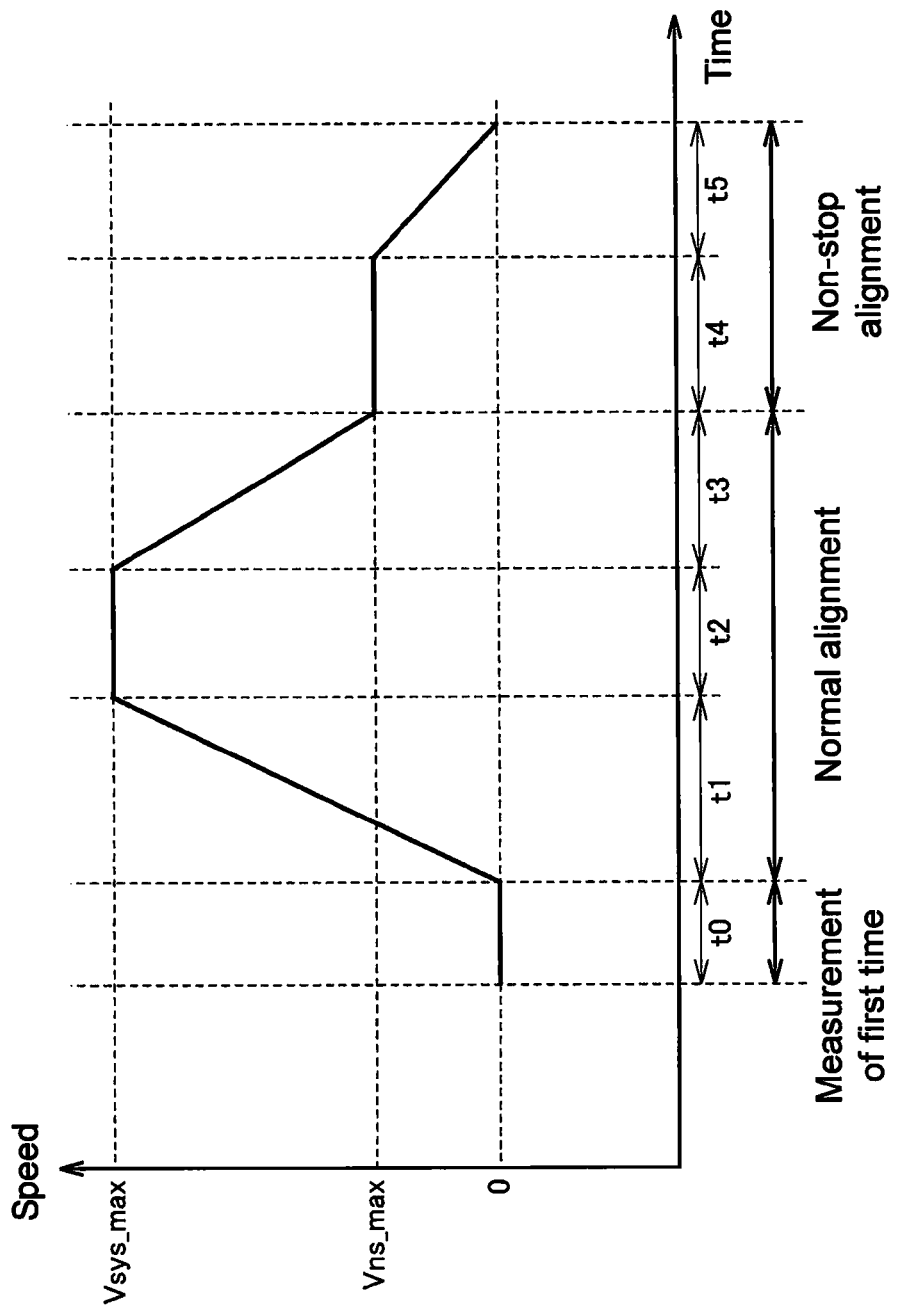
FIG. 7 is a diagram for describing a speed pattern of alignment according to the embodiment.

FIG. 7 is a diagram for describing a speed pattern of alignment according to the embodiment. FIG. 8 is a diagram illustrating system parameters for executing the alignment according to the embodiment.

Referring to FIG. 7, the motion of the alignment according to the embodiment can be divided into a total of six sections of time t0 to time t5.

Time t0 is time necessary for imaging a workpiece by image processing device 100, calculating the difference (vector amount) to the target location of the workpiece, and determining motion in the XY movement with respect to the workpiece (initial measurement). In time t0, a speed pattern according to the normal alignment or the like is determined.

Times t1 to t3 correspond to a period of the normal alignment. Time t1 corresponds to the acceleration period in the normal alignment. In time t1, stage 300 accelerates at the allowable maximum acceleration of the system. Time t2 corresponds to a period in which stage 300 approaches the target location at highest speed. In time t2, stage 300 moves at the allowable maximum speed Vsys_max of the system, which is a constant speed. Time t3 corresponds to a deceleration period in the normal alignment. In time t3, stage 300 decelerates at the allowable maximum speed of the system.

Subsequently, times t4 and t5 correspond to a period of the non-stop alignment. In time t4, imaging and motion correction are repeated continuously, and stage 300 moves the workpiece close to the target location. In time t4, basically, stage 300 moves at a constant speed at the allowable maximum speed Vns_max of the non-stop alignment. Time t5 corresponds to a deceleration period in the non-stop alignment. At a time point of lapse of time t5, the workpiece is positioned at the target location.

The lengths of times t1 to t5 and corresponding movement distances d1 to d5 can be calculated according to the following equations (1) to (6) by using system parameters as illustrated in FIG. 8. The system parameters illustrated in FIG. 8 include the specifications of system components and system requests.

Equation 1

$$V_{ns\_max} = R/(res \times f) \brace t_0 = f \quad (1)$$

$$t_1 = \frac{V_{sys\_max}}{\alpha} \brace d_1 = \frac{\alpha \times t_1^2}{2} \quad (2)$$

$$t_2 = \frac{d_2}{V_{sys\_max}} \brace d_2 = (d_{max} - d_{ns}) - d_1 - d_3 = (d_{max} - d_{ns}) - \frac{\alpha \times t_1^2}{2} - \left\{V_{sys\_max} \times t_3 - \frac{\alpha \times t_3^2}{2}\right\} \quad (3)$$

$$t_3 = \frac{(V_{sys\_max} - V_{ns\_max})}{\alpha} \brace d_3 = \left\{V_{sys\_max} \times t_3 - \frac{\alpha \times t_3^2}{2}\right\} \quad (4)$$

$$t_4 = \frac{d_4}{V_{ns\_max}} \brace d_4 = d_{ns} - d_5 = d_{ns} - \frac{\alpha \times t_5^2}{2} \quad (5)$$

$$t_5 = \frac{V_{ns\_max}}{\alpha} \brace d_5 = \frac{\alpha \times t_5^2}{2} \quad (6)$$

To shorten the movement time as a whole, the following requirements are important.

(a) Deceleration start timing in the normal alignment: the later start timing is more preferable (b) Non-stop alignment start timing: the later start timing is more preferable That is, it is preferable to set time t2 longer and set time t4 shorter. Referring to the above-described equations (3) and (5), it is understood that by further reducing the non-stop alignment start distance dns (hereinafter, also referred to as "NSA start distance dns"), the above-described requirements (a) and (b) are satisfied.

The NSA start distance dns corresponds to a margin distance for preventing the workpiece from passing the target location at the time point when the control mode is changed to the non-stop alignment (non-stop alignment start timing illustrated in FIG. 7 (start time of time t4) even if there is the influence of a measurement error in the image processing caused by a calibration error, noise of a camera, or the like. That is, by optimizing the margin distance (NSA start distance dns) in accordance with the system, the movement time as a whole can be shortened. A method of determining the NSA start distance dns and a method of optimizing the distance dns will be described later.

It is preferable to optimize the non-stop alignment allowable maximum speed Vns_max together with the NSA start distance dns.

FIG. 9 is a diagram for describing a method of determining a non-stop alignment allowable maximum speed Vns_max used for the alignment according to the embodiment. First, to maintain controllability of the non-stop alignment, stage 300 needs to be stopped within one non-stop alignment control cycle "f". That is, deceleration needs to be completed within the non-stop alignment control cycle "f". Consequently, a condition to satisfy the requirement can be expressed as follows with the system allowable maximum acceleration as α.

$$Vns\_max \leq \alpha \times f \quad (1)$$

In control system 1, an instruction is given from motion controller 200 to a servo unit based on position information obtained by image processing device 100, so that delay by the amount of one non-stop alignment control cycle "f" occurs at the maximum. Consequently, an error occurs by distance in which stage 300 moves in two cycles (corresponding to total of areas S1 and S2 in FIG. 9). The error which may occur needs to be made smaller than required accuracy R. Therefore, a condition to satisfy the requirement can be expressed as follows.

$$S=S1+S2=Vns\_max \times f+Vns\_max \times f/2=Vns\_max \times f \times 3/2 \leq R$$

By organizing the equation, the following condition is derived.

$$Vns\_max \leq 2R/3f \quad (2)$$

The non-stop alignment allowable maximum speed Vns_max is determined so as to satisfy the equations (1) and (2) at the same time.

As described above, when the distance between the object and the target location becomes equal to or less than a distance according to an error which occurs in a position specified by image processing device 100, switching from the first control operation (normal alignment) to the second control operation (non-stop alignment) is executed. The procedure of determining the distance according to the error will be described later.

The control instruction in the first control operation (normal alignment) includes an instruction of accelerating the moving mechanism (stage 300) at the allowable maximum acceleration.

F. Procedure of Alignment According to Embodiment

Figure 10:
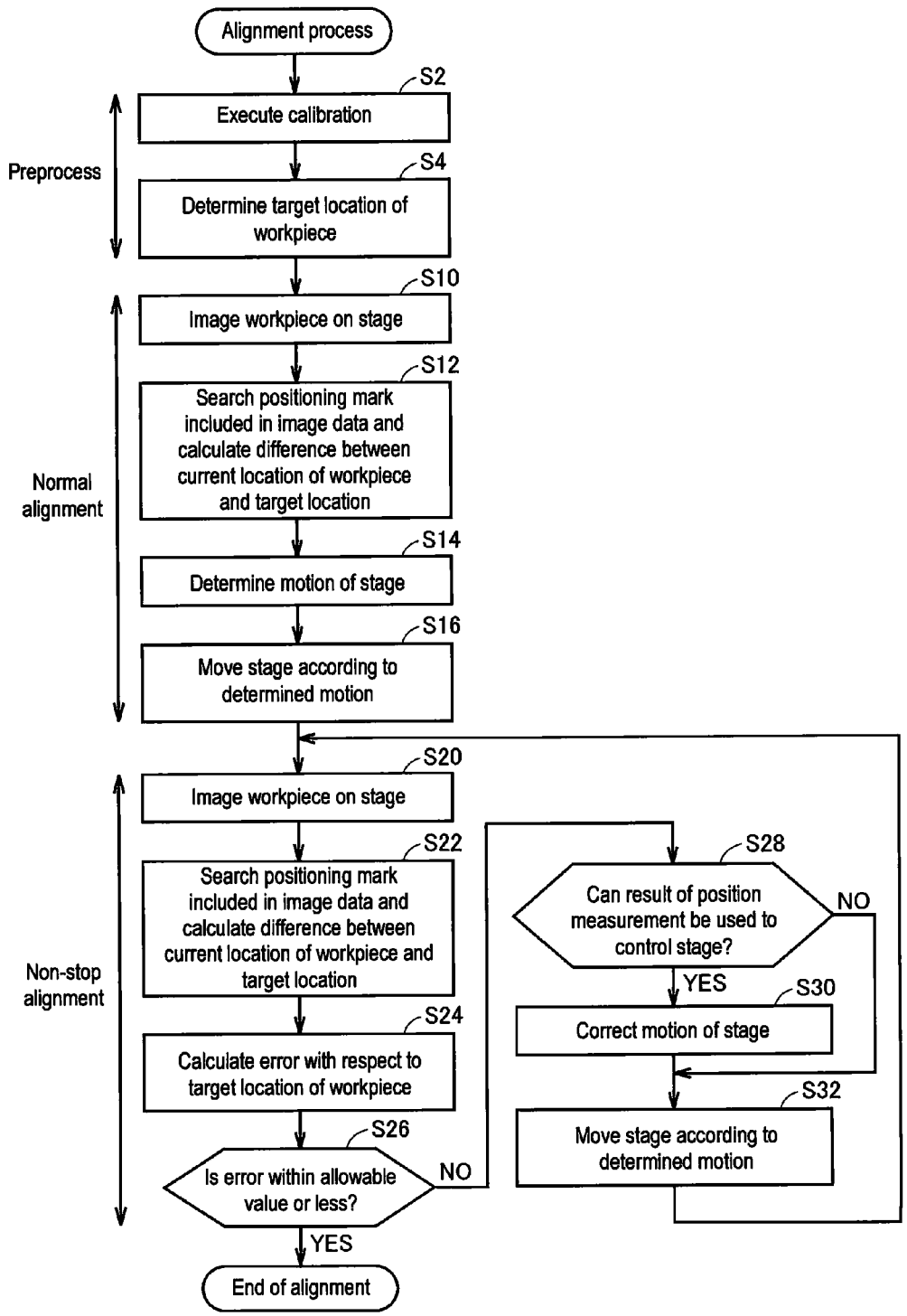
FIG. 10 is a flowchart illustrating a procedure of the alignment according to the embodiment.

Next, the procedure of alignment according to the embodiment will be described. FIG. 10 is a flowchart illustrating a procedure of the alignment according to the embodiment. Steps illustrated in FIG. 10 are basically executed by cooperation of image processing device 100 and motion controller 200. In the embodiment, a configuration of using two processing bodies (image processing device 100 and motion controller 200) will be described as an example. However, a mode in which the processing bodies are integrated may be also employed. In this case, the following steps are executed by the integrated processing body. That is, each of processes for performing the alignment according to the embodiment is executed by cooperation of image processing device 100 and motion controller 200 or executed singularly by one of image processing device 100 and motion controller 200. The allotment of the processing is a kind of design matters and is properly selected according to a system requirement and various constraints.

Referring to FIG. 10, image processing device 100 executes calibration for specifying the positional relations between the visual fields in cameras 102 and 104 and the coordinates of stage 300 (step S2). By the calibration, the movement amount of stage 300 can be calculated from the positions (pixel positions) of positioning marks 12 and 14 imaged by cameras 102 and 104.

Subsequently, image processing device 100 images positioning marks 12 and 14 on the workpiece by cameras 102 and 104, respectively, and determines the target location of the workpiece (step S4). Steps S2 and S4 are preprocesses related to alignment. Once steps S2 and S4 are executed, parameters obtained in the preprocesses can be used until a target workpiece is changed. Consequently, at the time of execution of the second and subsequent alignments, execution of steps S2 and S4 may be skipped.

Subsequently, the workpiece to be aligned is disposed on stage 300, and then the processes in step S10 and subsequent steps are executed. More specifically, first, image processing device 100 images the workpiece on stage 300 (step S10). Subsequently, image processing device 100 searches positioning marks 12 and 14 included in image data generated by imaging the workpiece by cameras 102 and 104, and calculates the difference between the current location and the target location of the workpiece based on the search result (step S12). That is, image processing device 100 images positioning marks 12 and 14 on the workpiece by cameras 102 and 104 and measures coordinates of the workpiece. That is, image processing device 100 executes position measurement on the workpiece. The measurement result is transmitted from image processing device 100 to motion controller 200.

Motion controller 200 calculates a distance (movement amount) in which stage 300 needs to be moved based on the difference to the target location, and determines the motion (target path, speed pattern, acceleration pattern, or the like) of stage 300 (step S14). The difference calculated at this time is a vector amount. For example, distance and angle from the current location to the target location are calculated. Motion controller 200 gives an instruction to the servo driver in accordance with the determined motion, thereby moving stage 300 (step S16). The motion determined in step S14 corresponds to the interval of the normal alignment, and the motion in the interval of the non-stop alignment is sequentially determined in step S20 and subsequent steps.

Any data structure may be used as a data structure defining a motion determined or corrected by motion controller 200. That is, it is sufficient that stage 300 can be moved as illustrated in FIG. 7.

When the movement of stage 300 according to the motion determined in step S14 is completed, that is, when the moving process in times t1 to t3 illustrated in FIG. 7 is completed, the non-stop alignment is started. In other words, the processes in steps S10 to S16 correspond to the processes in the normal alignment, and the processes in steps S20 to S32 correspond to the processes in the non-stop alignment.

When the non-stop alignment is started, image processing device 100 images the workpiece on stage 300 (step S20). Subsequently, image processing device 100 searches positioning marks 12 and 14 included in the image data generated by imaging the workpiece by cameras 102 and 104, and based on the search result, calculates the difference between the current location and the target location of the workpiece (step S22). The result of measurement of the position of the workpiece by image processing device 100 is transmitted from image processing device 100 to motion controller 200.

Motion controller 200 calculates an error with respect to the target location of the workpiece (step S24), and determines whether the calculated error is a preliminarily specified allowable value or less (step S26). In the case where the calculated error is the allowable value or less (YES in step S26), the alignment is finished. That is, motion controller 200 moves stage 300 so that the difference between the current location and the target location of the workpiece becomes the allowable value or less.

In the case where the calculated error exceeds the allowable value (NO in step S26), motion controller 200 determines whether the result of position measurement obtained from image processing device 100 can be used for control of stage 300 (step S28). That is, it is determined whether the position measurement of the workpiece is properly executed in image processing device 100.

In the case where it is determined that the result of position measurement obtained from image processing device 100 can be used for control of stage 300 (YES in step S28), motion controller 200 calculates the distance (movement amount) in which stage 300 is to move and corrects the motion (target path, speed pattern, acceleration pattern, or the like) of stage 300 (step S30). Then, motion controller 200 gives an instruction to the servo drive in accordance with the determined motion, thereby moving stage 300 (step S32).

On the contrary, in the case where it is determined that the result of position measurement obtained from image processing device 100 cannot be used for control of stage 300 (NO in step S28), the process in step S30 is skipped. That is, the motion determined/corrected earlier is used as it is.

After lapse of predetermined time since execution of step S32, the processes in step S20 and the subsequent steps are executed again.

By the procedure as described above, the alignment according to the embodiment is executed. When alignment on a workpiece is completed, the positioned workpiece is carried to the next process, and a new workpiece is received. The processes in step S10 and subsequent steps are repeatedly executed on the new workpiece.

Hereinafter, the contents of the processes in some of the above-described steps will be described more specifically. The process in step S28 is an option and is not an essential process. That is, step S30 may be executed without performing the determination in step S28.

G. Calibration

The calibration in step S2 in the procedure of FIG. 10 will be described. The calibration refers to a process of matching the coordinate system of stage 300 and the coordinate system of cameras 102 and 104. That is, it is a process of determining the relation between the position information obtained by imaging the workpiece by cameras 102 and 104 and the position information of the actual workpiece (or stage 300).

Figure 11:
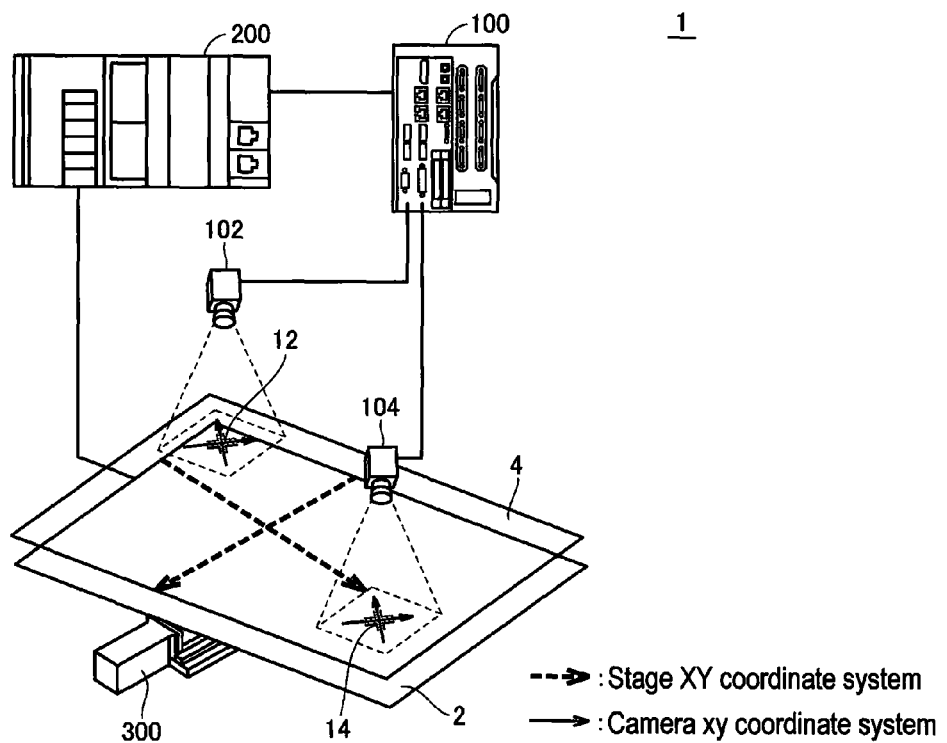
FIG. 11 is a diagram for describing calibration as a preprocess for the alignment according to the embodiment.
Figure 12:
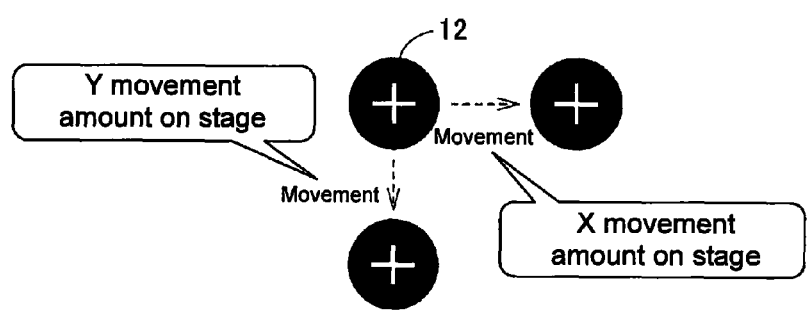
FIG. 12 is a diagram for describing the principle of calibration as a preprocess for the alignment according to the embodiment.

FIG. 11 is a diagram for describing calibration as a preprocess for the alignment according to the embodiment. FIG. 12 is a diagram for describing the principle of calibration as a preprocess for the alignment according to the embodiment.

Referring to FIG. 11, when positioning marks 12 and 14 on the workpiece (glass substrate 2) are imaged by cameras 102 and 104, a stage XY coordinate system as a coordinate system of actual stage 300 and a camera xy coordinate system (corresponding to pixel positions of image data) recognized by cameras 102 and 104 do not match. Consequently, in the calibration, the coordinate systems are matched.

More specifically, as illustrated in FIG. 12, by moving the workpiece provided with positioning marks 12 and 14, and comparing the movement amount in the stage XY coordinate system and the movement amount in the camera xy coordinate system, a calibration parameter (typically, an affine transformation parameter) as will be described later is optimization-calculated.

More specifically, the positioning mark (cross mark in the example of FIG. 12) on the workpiece is imaged. Thereafter, the workpiece is moved by a predetermined distance (movement amount ΔX) along the X direction of stage 300 (not moved in the Y direction), and the positioning mark after the movement is imaged again. Similarly, the workpiece is moved by a predetermined distance (movement amount ΔY) along the Y direction of stage 300 from the initial position (not moved in the X direction), and the positioning mark after the movement is imaged again.

In the respective coordinate systems, a calibration parameter can be determined by using the calculated positions (coordinates) of the three positioning marks illustrated in FIG. 12. More specifically, by using three coordinates in the stage XY coordinate system and corresponding three coordinates in the camera xy coordinate system, affine transformation parameters "a" to "f" in the following equation are calculated.

Equation 2

$$\underbrace{\begin{pmatrix} X \\ Y \\ 1 \end{pmatrix}}_{\substack{Stage \\ coordinate \\ system}} = \underbrace{\begin{pmatrix} a & b & c \\ d & e & f \\ 0 & 0 & 1 \end{pmatrix}}_{\substack{Affine \\ transformation \\ parameters}} \underbrace{\begin{pmatrix} x \\ y \\ 1 \end{pmatrix}}_{\substack{camera \\ coordinate \\ system}}$$

By the affine transformation parameter, coordinate values in the camera xy coordinate system and coordinate values in the stage XY coordinate system can be mutually transformed.

H. Determination of Target Location

Rotation Center

A process of determining a target location of a workpiece in step S4 in the procedure of FIG. 10 will be described. In control system 1 according to the embodiment, stage 300 can be moved in the XY direction and rotated in the θ direction. By setting the rotation center of the workpiece by stage 300 to the target location, positioning in which movement in the XY direction and rotation in the θ direction of the workpiece are matched can be performed by using stage 300. Consequently, in the embodiment, as a preprocess, the rotation center of stage 300 is preliminarily specified and determined as the target location.

Figure 13:
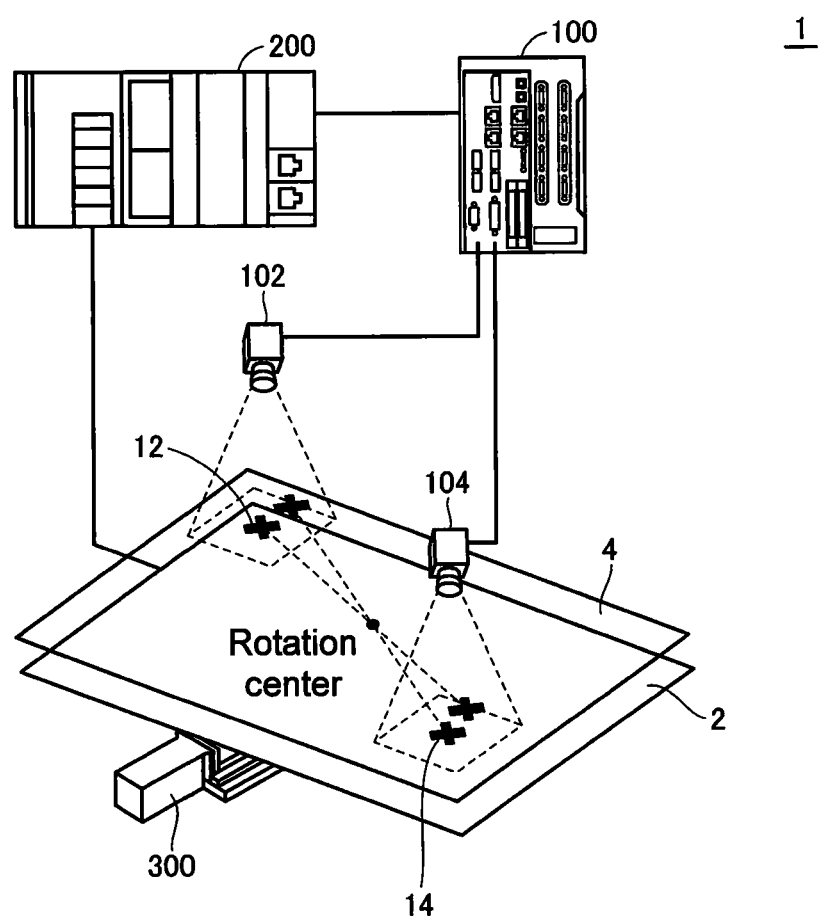
FIG. 13 is a diagram for describing a process of determining a target location (rotation center) as a preprocess for the alignment according to the embodiment.
Figure 14A:
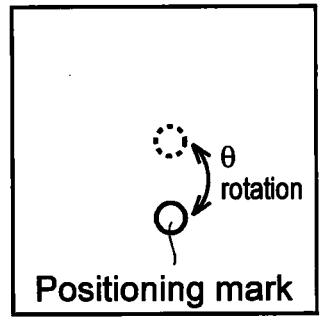
FIGS. 14A to 14C are diagrams for describing the principle of a process of determining a target location (rotation center) as a preprocess for the alignment according to the embodiment.
Figure 14B:
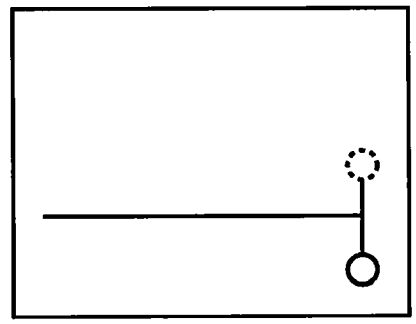
Figure 14C:
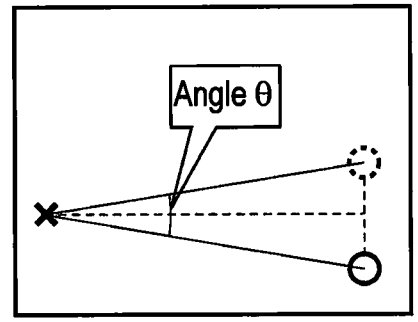

FIG. 13 is a diagram for describing a process of determining a target location (rotation center) as a preprocess for the alignment according to the embodiment. FIGS. 14A to 14C are diagrams for describing the principle of a process of determining a target location (rotation center) as a preprocess for the alignment according to the embodiment.

Referring to FIG. 13, first, the workpiece (glass substrate 2) is disposed at a correct position on stage 300. At this time, the positional accuracy of disposing a workpiece is important, so that a dedicated jig and a master workpiece having accurate dimensions are used.

Image processing device 100 images positioning marks 12 and 14 on the workpiece by cameras 102 and 104 and measures the coordinates of the workpiece (the coordinates and the rotation angle of the rotation center). The coordinates of the rotation center are set as the target location. That is, the coordinates of the rotation center of the workpiece (stage 300) are calculated from the coordinates of positioning marks 12 and 14 imaged by two cameras 102 and 104 whose visual fields are away from each other.

As illustrated in FIGS. 14A to 14C, stage 300 is turned by angle θ, and the rotation center is estimated based on a change in the position of the positioning marks before and after the turn. More specifically, as illustrated in FIG. 14A, the workpiece provided with the positioning workpiece is turned by the angle θ by stage 300. The positioning marks before and after the rotation are illustrated as a "first sampling point" and a "second sampling point", respectively. As illustrated in FIG. 14B, a straight line passing the coordinate points of the two positioning marks before and after the rotation of the angle θ is defined, and as illustrated in FIG. 14C, coordinates are calculated such that the angle formed between the two positioning marks becomes the angle θ on perpendicular bisectors of the straight line. The calculated coordinates are determined as coordinates of the rotation center of stage 300.

Refer to JP 2006-049755 A (Patent Document 2) for details.

I. Method of Determining Non-Stop Alignment Start Distance Dns

As described above, by further reducing the non-stop alignment start distance (NSA start distance) dns, the movement time as a whole can be shortened. That is, to promptly complete the alignment according to the embodiment, preferably, the NSA start distance dns is shorter, that is, the NSA start distance (non-stop alignment start position) is closer to the target location.

On the other hand, the NSA start distance dns corresponds to a margin distance for preventing a workpiece from passing the target location, and from the viewpoint of control stability, it is preferable that the NSA start distance dns is longer. It is therefore necessary to properly determine the NSA start distance dns.

Figure 15:
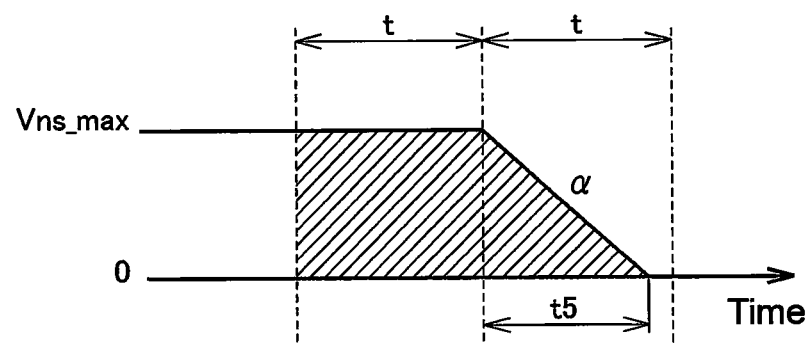
FIG. 15 is a diagram for describing a method of determining a theoretical value of a non-stop alignment start distance dns used for the alignment according to the embodiment.

FIG. 15 is a diagram for describing a method of determining a theoretical value of the non-stop alignment start distance dns used for the alignment according to the embodiment. With reference to FIG. 15, after image processing device 100 images a workpiece and until an instruction is given to motion controller 200, waste time corresponding to one non-stop alignment control cycle "f" occurs, and further, stage 300 moves also in a deceleration period (time t5). In consideration of such a slide distance, the NSA start distance dns can be calculated by the following equation.

$$dns = \text{Vns\_max} \times f + \alpha \times t5^2/2$$
$$= \text{Vns\_max} \times \text{Vns\_max}^2/2\alpha$$

In addition to the consideration in the theoretical value, the non-stop alignment start distance dns needs to be determined in consideration of various errors which dynamically fluctuate. Specifically, the minimum value of the NSA start distance dns corresponds to the maximum value of an error included in a movement amount calculated from the result of image processing by imaging of the first time. Causes of such an error can be classified into (a) a measurement error due to noise in a camera and (b) characteristics of the stage and an optical system. The cause (a) changes for each measurement and the cause (b) depends on the measurement position and does not change for each measurement.

The cause (a) can be estimated to a certain degree by using statistical data of an image sensor used for the camera. The cause (b) can be estimated by being experimentally measured in advance by a procedure to be described later.

By experimentally measuring an error which occurs in the case of actually moving a workpiece, the NSA start distance can be determined experimentally.

Finally, the sum of a theoretical value and an experimental value of the NSA start distance determined as described above is determined as the NSA start distance dns. That is, the margin distance (NSA start distance dns) is a sum of a first distance and a second distance. The first distance is determined by comparing a result obtained by the image processing section with a predetermined movement amount, the result obtained by specifying the position of the object after the moving mechanism's predetermined movement. The second distance is a movement amount of the moving mechanism during a period in which the moving mechanism is moved at the second speed after the image processing section obtains image data and until the image processing section specifies the position of the characteristic part, and until the moving mechanism is decelerated from the second speed at the allowable maximum acceleration to be stopped.

Hereinafter, a method of experimentally determining the NSA start distance will be described.

i1: Determining Method No. 1

Figure 16:
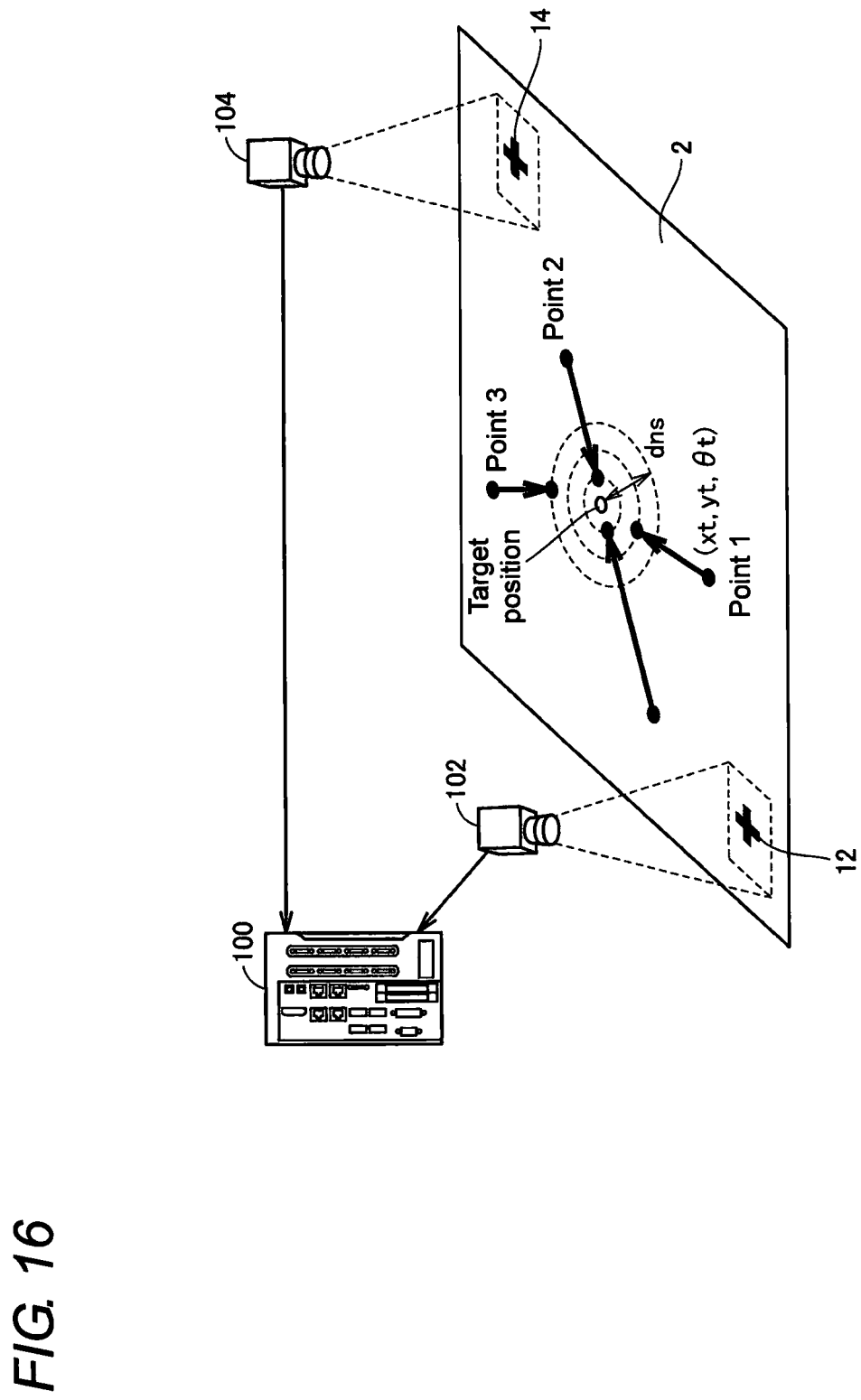
FIG. 16 is a diagram for describing a method (No. 1) of determining the non-stop alignment start distance used for the alignment according to the embodiment.
Figure 17:
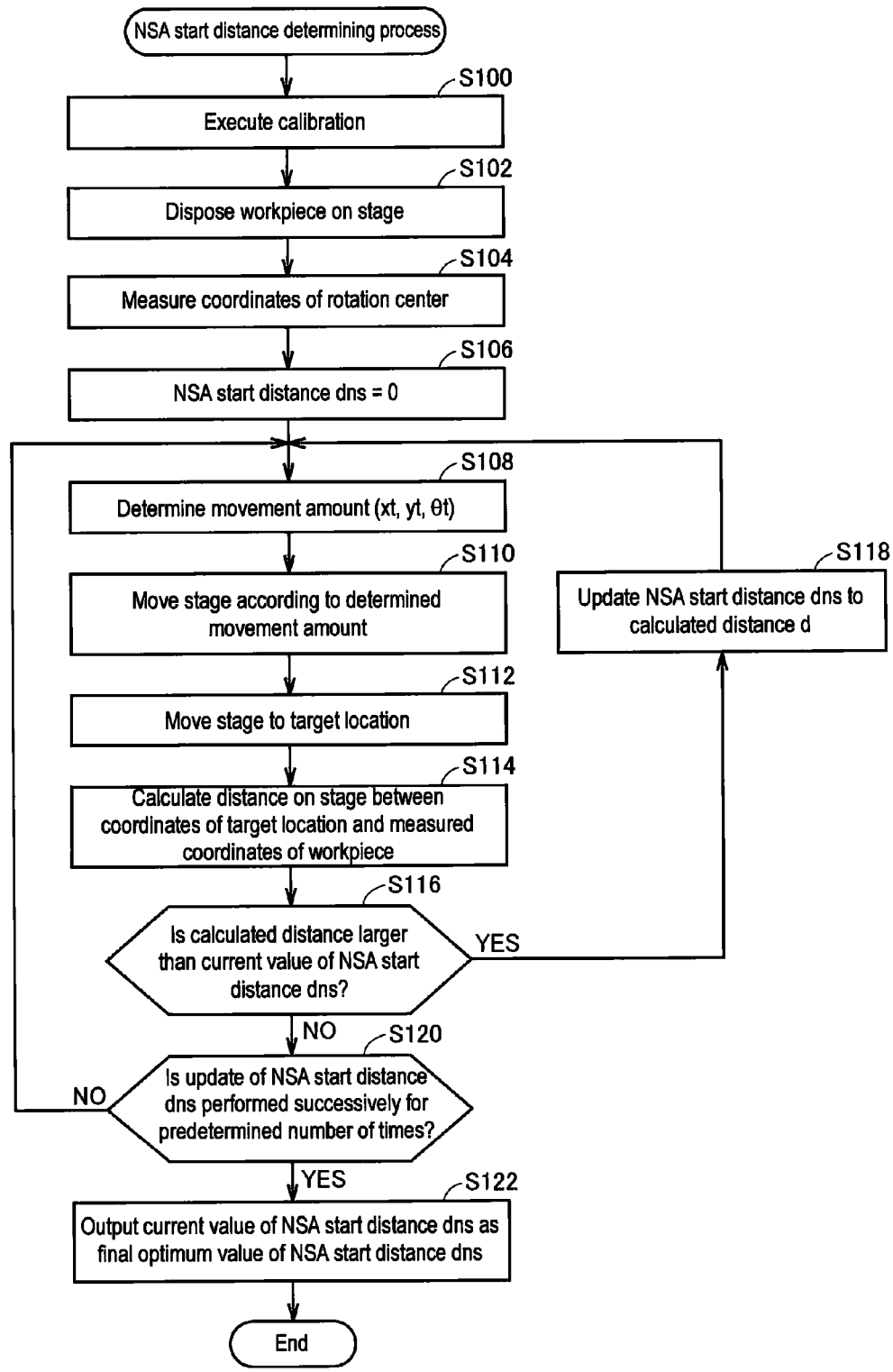
FIG. 17 is a flowchart illustrating a procedure of determining the non-stop alignment start distance illustrated in FIG. 16.

FIG. 16 is a diagram for describing a method (No. 1) of determining the non-stop alignment start distance dns used for the alignment according to the embodiment. In the method illustrated in FIG. 16, the movement amount (vector amount) of a workpiece is determined at random, and an error which occurs in the case of moving the workpiece by the movement amount determined at random is experimentally obtained. FIG. 17 is a flowchart illustrating a procedure of determining the non-stop alignment start distance dns illustrated in FIG. 16.

Referring to FIGS. 16 and 17, image processing device 100 executes calibration for specifying the position relation between the visual field in cameras 102 and 104 and the coordinates of stage 300 (step S100). That is, the coordinate system of stage 300 and the coordinate system of cameras 102 and 104 are matched. Subsequently, the user disposes a workpiece (glass substrate 2) at a predetermined position on stage 300 (step S102). At this time, since the positional accuracy of disposing the workpiece is important, a dedicated jig and a master workpiece having accurate dimensions are used.

Image processing device 100 images positioning marks 12 and 14 on the workpiece by cameras 102 and 104, respectively, and measures the coordinates (the coordinates of the rotation center and the rotation angle) of the workpiece (step S104). The coordinates (X0, Y0, θ0) of the rotation center are set as the target location.

In such a manner, the preprocess for determining the NSA start distance is completed. Image processing device 100 sets zero as the initial value of the NSA start distance dns (step S106). Subsequently, motion controller 200 determines the movement amount (xt, yt, θt) at random so that positioning marks 12 and 14 enter the visual field of cameras 102 and 104, respectively (step S108), and moves stage 300 by giving an instruction to the servo driver in accordance with the determined movement amount (step S110).

After movement of stage 300, motion controller 200 moves stage 300 to the target location again (step S112). That is, a process of moving the moving mechanism (stage 300) by a predetermined movement amount is executed. Image processing device 100 images positioning marks 12 and 14 on the workpiece by cameras 102 and 104, respectively, measures the coordinates (X1, Y1, θ1) of the workpiece, and calculates the distance d on stage 300 between the coordinates of the target location and the measured coordinates of the workpiece (step S114). Specifically, the distance d corresponds to the distance between the coordinates (X0, Y0) of the target location and the measured coordinates (X1, Y1) of the workpiece. That is, there is executed the process of specifying the position from image data obtained by imaging the position of the object after movement.

Thereafter, image processing device 100 compares the current value of the NSA start distance dns and the calculated distance d, and determines whether the calculated distance d is larger than the current value of the NSA start distance dns (step S116). In the case where the calculated distance d is larger than the current value of the NSA start distance dns (YES in step S116), image processing device 100 updates the NSA start distance dns to the calculated distance d (step S118). Then, the processes in step S108 and the subsequent steps are repeated.

On the other hand, in the case where the calculated distance d is smaller than the current value of the NSA start distance dns (NO in step S116), image processing device 100 determines whether updating of the NSA start distance dns is performed successively for a predetermined number of times (step S120). That is, it is determined whether the current value of the NSA start distance dns is the maximum value of an error which may occur. In the case where the updating of the NSA start distance dns is performed within last predetermined number of times (NO in step S120), the processes in step S108 and the subsequent steps are repeated.

On the other hand, in the case where the updating of the NSA start distance dns is not performed successively for a plurality of times (YES in step S120), image processing device 100 outputs the current value of the NSA start distance dns as the optimum value of the final NSA start distance dns (step S122). Thereafter, the processes are finished.

As described above, the process of moving the moving mechanism (stage 300) a plurality of times and determining the distance according to the error (NSA start distance dns) in accordance with comparison between a predetermined movement amount and the specified position of the object is executed.

i2: Determining Method No. 2

Figure 18:
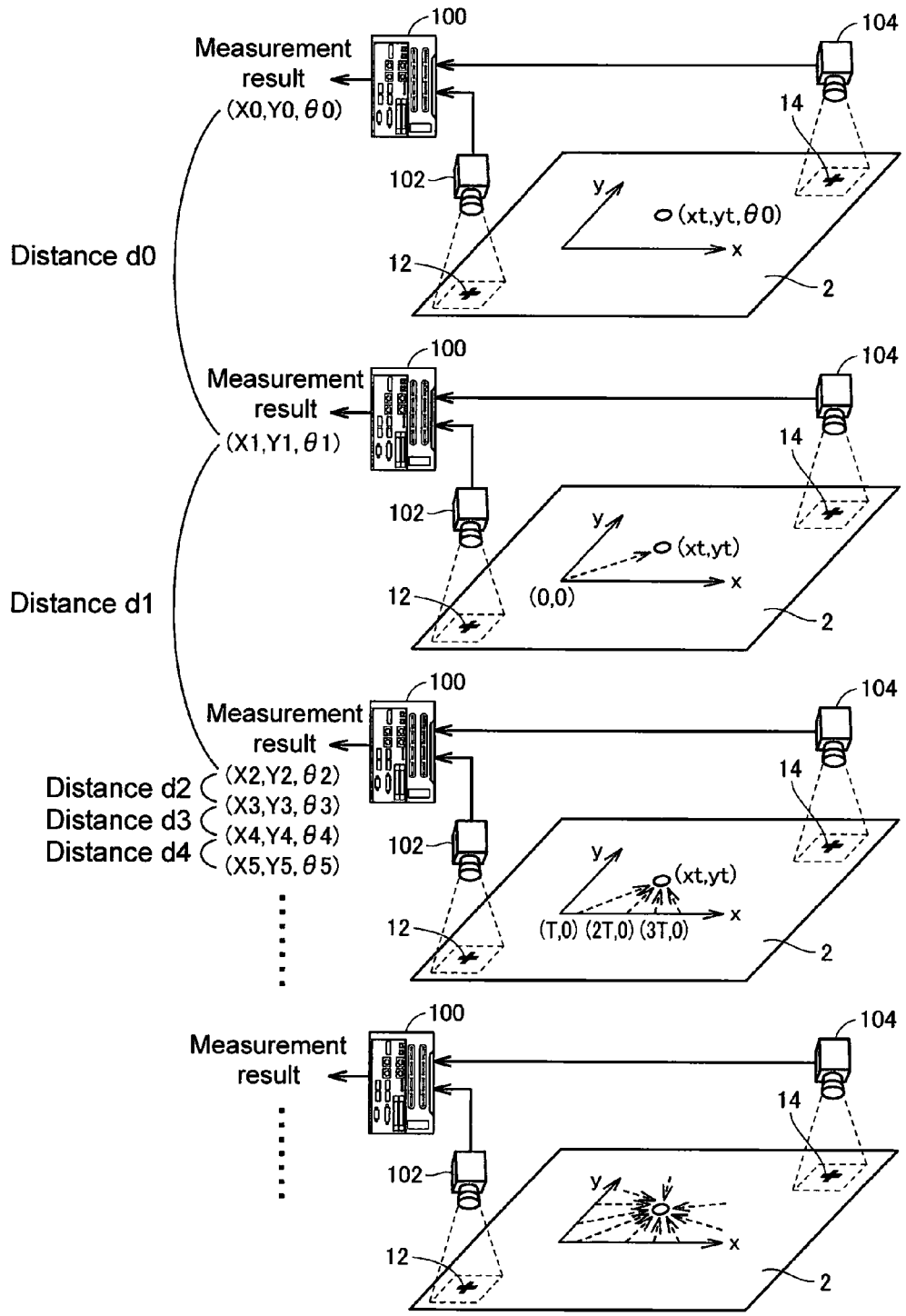
FIG. 18 is a diagram for describing a method (No. 2) of determining the non-stop alignment start distance used for the alignment according to the embodiment.
Figure 19:
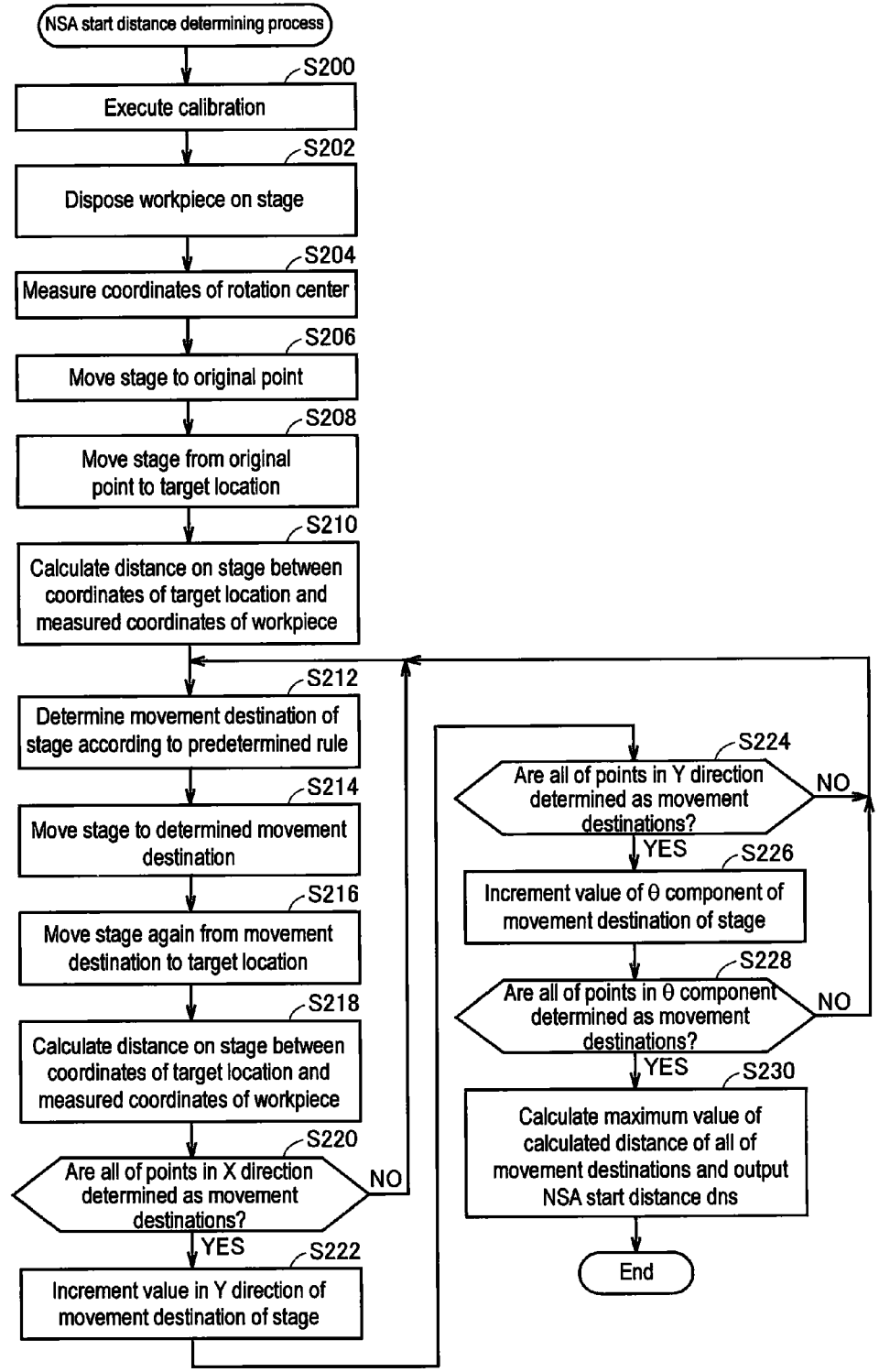
FIG. 19 is a flowchart illustrating a procedure of determining the non-stop alignment start distance illustrated in FIG. 18.

FIG. 18 is a diagram for describing a method (No. 2) of determining the non-stop alignment start distance dns used for the alignment according to the embodiment. The method illustrated in FIG. 16 has described the method of determining the movement amount of the workpiece at random and calculating the NSA start distance dns. The method illustrated in FIG. 18 describes a method of calculating the NSA start distance dns by evaluating an error in each of the coordinates disposed regularly. FIG. 19 is a flowchart illustrating a procedure of determining the non-stop alignment start distance dns illustrated in FIG. 18.

Referring to FIG. 18 and FIG. 19, image processing device 100 executes calibration for specifying the position relation between the visual field in cameras 102 and 104 and the coordinates of stage 300 (step S200). That is, the coordinate system of stage 300 and the coordinate system of cameras 102 and 104 are matched. Subsequently, the user disposes a workpiece (glass substrate 2) at a predetermined position on stage 300 (step S202). At this time, since the positional accuracy of disposing the workpiece is important, a dedicated jig and a master workpiece having accurate dimensions are used.

Image processing device 100 images positioning marks 12 and 14 on the workpiece by cameras 102 and 104, respectively, and measures the coordinates (the coordinates of the rotation center and the rotation angle) of the workpiece (step S204). The coordinates (X0, Y0, θ0) of the rotation center are set as the target location (refer to the first (top) part of FIG. 18). In such a manner, the preprocess for determining the NSA start distance is completed.

First, motion controller 200 moves stage 300 to the origin ((x, y, θ)=(0, 0, 0)) (step S206). Thereafter, as illustrated in the second part of FIG. 18, motion controller 200 moves stage 300 again from the origin to the target location (x0, y0, θ0) (step S208). After the movement of stage 300, image processing device 100 images positioning marks 12 and 14 on the workpiece by cameras 102 and 104, respectively, measures the coordinates (X1, Y1, θ1) of the workpiece, and calculates the distance d1 on stage 300 between the coordinates (X0, Y0, θ0) of the target location and the measured coordinates (X1, Y1, θ1) of the workpiece (step S210). Specifically, the distance d corresponds to the distance between the coordinates (X0, Y0) of the target location and the measured coordinates (X1, Y1) of the workpiece.

Next, motion controller 200 determines a movement destination of stage 300 in accordance with a predetermined rule (step S212). Specifically, as illustrated in the third part of FIG. 18, coordinates (T, 0, 0), (2T, 0, 0), and (3T, 0, 0) moved along the X direction of stage 300 are determined as movement destinations. That is, as movement destinations on a certain X axis, coordinates changed by predetermined change amount T are sequentially set.

Motion controller 200 moves stage 300 to the movement destination determined in step S212 (step S214). Thereafter, motion controller 200 moves stage 300 again from the movement destination to the target location (x0, y0, θ0) (step S216). After the movement of stage 300, image processing device 100 images positioning marks 12 and 14 on the workpiece by cameras 102 and 104, measures the coordinates of the workpiece, and calculates the distance do on stage 300 between the coordinates (X0, Y0, θ0) of the target location and the measured coordinates of the workpiece (step S218).

Thereafter, motion controller 200 determines whether all of points in the X direction are determined as movement destinations (step S220). In the case where all of the points in the X direction are not determined as movement destinations (NO in step S220), the processes in step S212 and the subsequent steps are executed again.

By the processes as described above, measured coordinates (X2, Y2, θ2), (X3, Y3, θ3), (X4, Y4, θ4), . . . obtained after movement to each of the movement destinations are obtained, and distances d2, d3, d4, . . . between the measured coordinates and (X0, Y0) are calculated.

In the case where all of points in the X direction are determined as movement destinations (YES in step S220), motion controller 200 increments the value in the Y direction of the movement destination of stage 300 by a predetermined value (step S222). That is, when the movement destination reaches the end of stage 300 or the end of the visual field of the camera, stage 300 is moved in the Y direction by T. Motion controller 200 determines whether all of points in the Y direction have been determined as movement destinations (step S224). In the case where all of points in the Y direction are not determined as movement destinations (NO in step S224), the processes in step S212 and the subsequent steps are executed again.

In the case where all of points in the Y direction are determined as movement destinations (YES in step S224), that is, the movement distance can be calculated with respect to all of the coordinates on stage 300, motion controller 200 increments the value of the θ component of the movement destination of stage 300 by a predetermined value (step S226). That is, when the movement destination reaches the end of stage 300 or the end of the visual field of the camera, stage 300 is turned by a predetermined value in the θ direction. Then, motion controller 200 determines whether all of points in the θ component have been decided as movement destinations (step S228). In the case where all of points in the θ component are not determined as movement destinations (NO in step S228), the processes in step S212 and the subsequent steps are executed again.

In such a manner, as illustrated in the fourth (bottom) part of FIG. 18, there is executed a process of calculating an error which occurs in the case of moving the movement destination to each of coordinates regularly disposed.

In the case where all of the points of the θ component are determined as movement destinations (YES in step S228), the maximum value of the distance d between the measurement coordinates (X, Y) and (X0, Y0) with respect to all of the calculated movement destinations (X, Y, θ) is calculated, and the calculated maximum value is output as an optimum value of the NSA start distance dns (step S230). Thereafter, the processes are finished.

J. Process at the Time of Measurement Failure

In step S28 of the procedure of FIG. 10, motion controller 200 determines whether the result of the position measurement obtained from image processing device 100 can be used to control stage 300. The determining process is not an essential step but is preferably executed to increase the positional accuracy of the non-stop alignment.

That is, in the non-stop alignment, the speed and position are dynamically controlled based on a measurement result by the image processing. Consequently, in the case where an error is large in the measurement result or in the case where longer time is required for measurement by the image processing, a large disturbance may occur in the control. As a result, a large time loss occurs.

Figure 20:
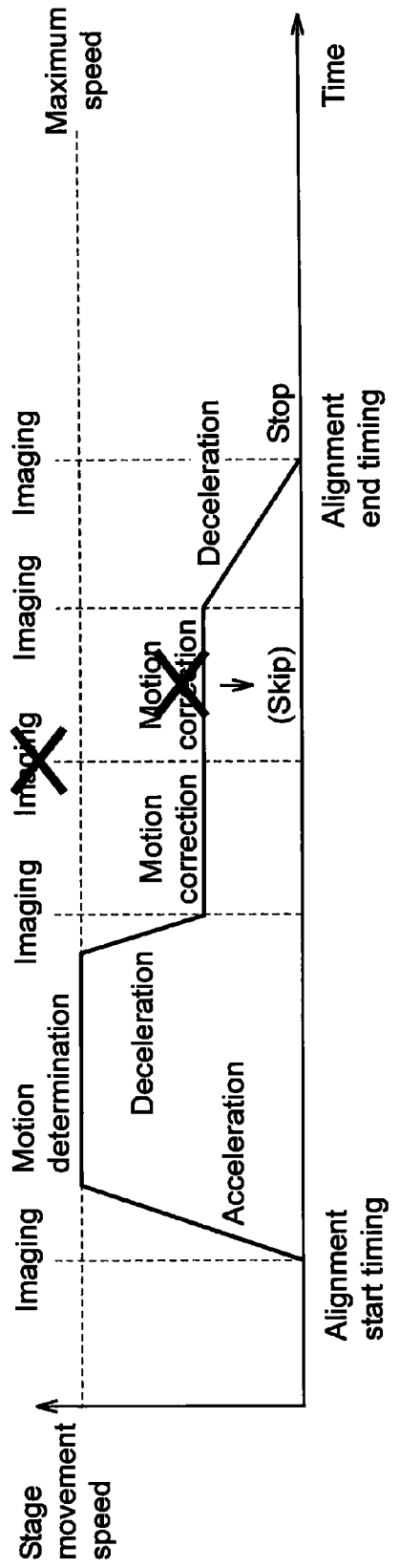
FIG. 20 is a diagram for describing a process in the case where a measuring process fails at the time of execution of the alignment according to the embodiment.

FIG. 20 is a diagram for describing a process in the case where a measuring process fails at the time of execution of the alignment according to the embodiment. As illustrated in FIG. 20, whether the result of position measurement obtained from image processing device 100 can be used for control of stage 300 is determined (refer to step S28 in FIG. 10). In the case where it is determined that the result cannot be used, the motion of stage 300 is not corrected and the movement of stage 300 is continued according to the motion determined/corrected earlier. In the motion determined/corrected earlier, the behavior to the target location is defined. Consequently, even if the motion is used as it is, a large problem does not occur.

As described above, the alignment according to the embodiment includes a logic of determining whether the result of the image processing can be used for the control of stage 300. In the case where it is determined that the result cannot used for control of stage 300, the current movement is continued without correcting the movement direction of stage 300. That is, in the second control operation (non-stop alignment), control system 1 according to the embodiment skips determination of the control instruction in the case where specification of the position of the characteristic part by image processing device 100 is not normal.

Examples of a criterion of determining whether the result of the position measurement can be used for control of stage 300 are as follows.

(1) A workpiece cannot be detected.

(2) The movement distance from the measurement result of last time is too large, or the difference from a current position estimated from an encoder value of a servo motor is equal to or larger than a threshold value (the movement distance in the non-stop alignment does not exceed the distance d4 of movement in time t4 illustrated in FIG. 8).

(3) The image processing is not completed within predetermined processing time (the image processing for the non-stop alignment is not allowed to exceed the non-stop alignment control cycle "f" illustrated in FIG. 8).

In the case of (3), initially, the image processing in image processing device 100 may be interrupted.

The determining function of whether the result of the position measurement can be used for control of stage 300 may be provided on image processing device 100 side. In this case, a determination result is notified from image processing device 100 to motion controller 200. In the case where the specification of the position of the characteristic part is not normal by image processing device 100, image processing device 100 skips determination of the control instruction.

K. Use Example of Two Kinds of Cameras Having Different Visual Field Sizes

First Modification

In the foregoing embodiment, the configuration of imaging the positioning marks by the cameras of one kind has been illustrated. To satisfy the required positional accuracy, a configuration using a plurality of cameras having different visual fields may be employed. That is, it is difficult for a single camera to satisfy both width of the visual field size and high resolution. When the required accuracy of the movement amount is high, an alignment system using a plurality of kinds of cameras having different visual field sizes may be employed.

Figure 21:
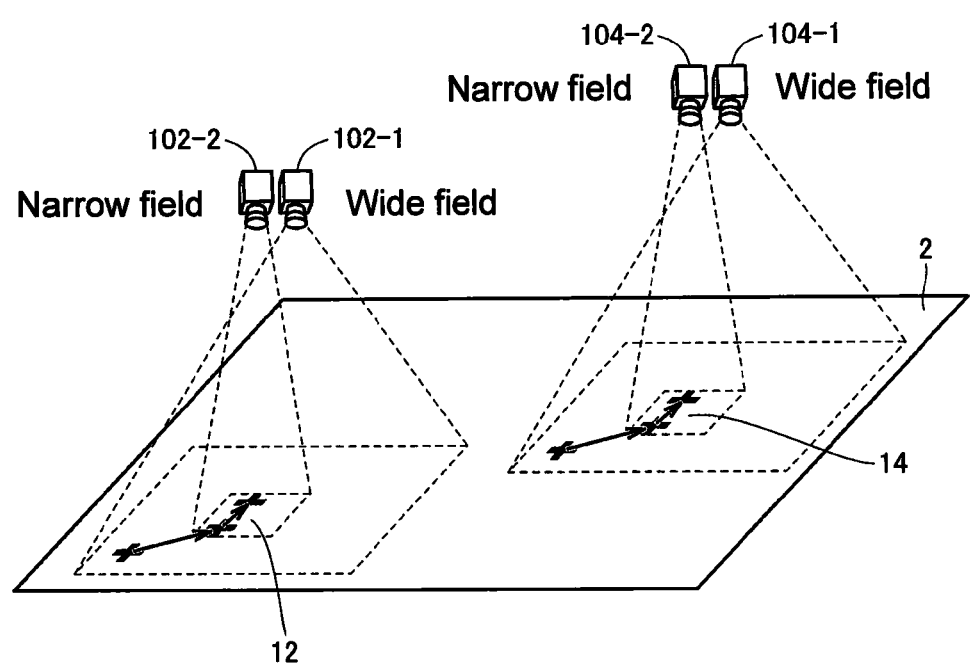
FIG. 21 is a schematic view for describing the configuration of a control system according to a first modification of the embodiment.
Figure 22:
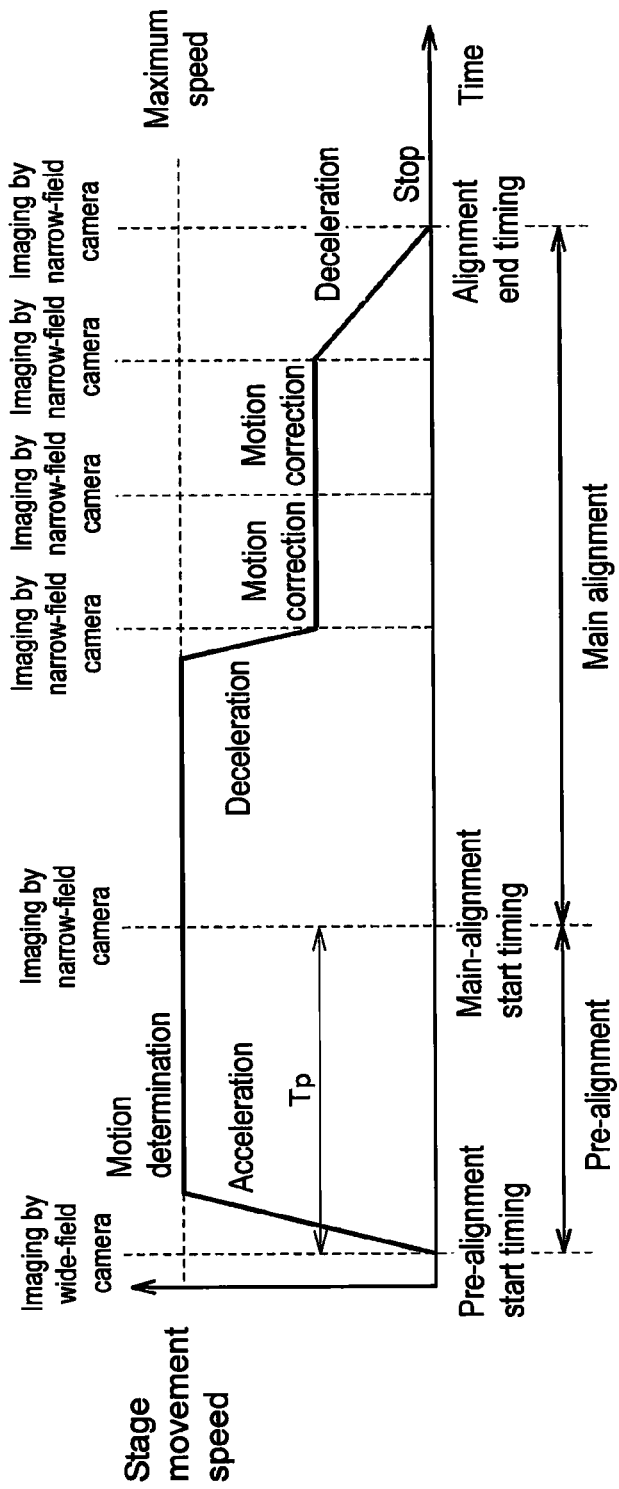
FIG. 22 is a diagram for describing alignment according to the first modification of the embodiment.

FIG. 21 is a schematic view for describing the configuration of a control system according to a first modification of the embodiment. FIG. 22 is a diagram for describing alignment according to the first modification of the embodiment.

In the control system illustrated in FIG. 21, two kinds of cameras having different visual field sizes are prepared so as to be associated with positioning marks 12 and 14. Cameras 102-1 and 104-1 (wide-field cameras) have a wider field, and image all the region in which a workpiece exists. On the other hand, cameras 102-2 and 104-2 (narrow-field cameras) have a narrower field, and image the region around the target location with higher resolution.

Specifically, image processing device 100 according to the first modification of the embodiment is configured to obtain image data from each of the first and second cameras having different visual field sizes.

Referring to FIG. 22, in the alignment according to the first modification, coarse position measurement is performed by imaging of the wide-field camera and a workpiece is moved to the inside of the visual field of the narrow-field camera. Thereafter, by performing position measurement more precisely by the narrow-field camera, the workpiece is positioned at the target location. In the first modification, for convenience of description, the coarse positioning by the wide-field camera is referred to as "pre-alignment", and the precise positioning by the narrow-field camera is referred to as "main alignment".

As described above, in the alignment according to the first modification of the embodiment, in the configuration of using a plurality of kinds of cameras having different visual fields to satisfy both high accuracy and wide visual field, time required for the movement is shortened by continuing the movement control without stopping stage 300 between the pre-alignment and the main alignment.

The main alignment may be started at a timing at which the workpiece enters the visual field of the narrow-field camera (main-alignment start timing). In this case, imaging start timing Tp (main-alignment start timing) of the narrow-field camera can be calculated by the following equation based on the shortest distance from the measurement position in the wide-field camera to the visual field of the narrow-field camera.

Equation 3

$$T_P = \frac{D}{V_{sys\_max}} + \frac{V_{sys\_max}}{2\alpha}$$

By disposing the positioning marks in the visual fields of both the wide-field camera and the narrow-field camera and performing calibration, the influence on the alignment on camera switching can be avoided.

Also in the case of using two kinds of cameras having different visual field sizes as illustrated in FIG. 21, alignment can be performed by continuously moving the stage without stopping the stage.

That is, control system 1 according to the first modification of the embodiment determines a control instruction used in the first control operation (normal alignment) based on image data from the first camera (wide-field camera) having a larger visual field size, and switches a destination of obtaining image data from the first camera to the second camera (narrow-field camera) having a smaller visual field size during movement of the moving mechanism in the first control operation.

As described above, by switching the wide-field camera to the narrow-field camera without stopping the stage, the time required for movement as a whole can be shortened.

Since both of the first camera (wide-field camera) and the second camera (narrow-field camera) are connected to image processing device 100, image processing device 100 may be provided with at least one of (1) a function of determining a control instruction and (2) a function of monitoring entry of a workpiece in the visual field of the second camera by the first or second camera, continuing normal alignment until the workpiece enters the visual field, and switching the camera when the workpiece enters the visual field. In this case, image processing device 100 determines a control instruction used in the first control operation (normal alignment) based on image data from the first camera having a larger visual field size, and image processing device 100 switches the camera from which the image data is obtained from the first camera to the second camera having a smaller visual field size during movement of the moving mechanism in the first control operation.

L. Movement in Vertical Direction

Second Modification

In the application example of the alignment system illustrated in FIG. 1, the stage is moved not only in the horizontal direction (XY plane) but also in the vertical direction (Z axis). As a second modification, there will be described a correcting process in the case where movement in the vertical direction is performed simultaneously.

Figure 23:
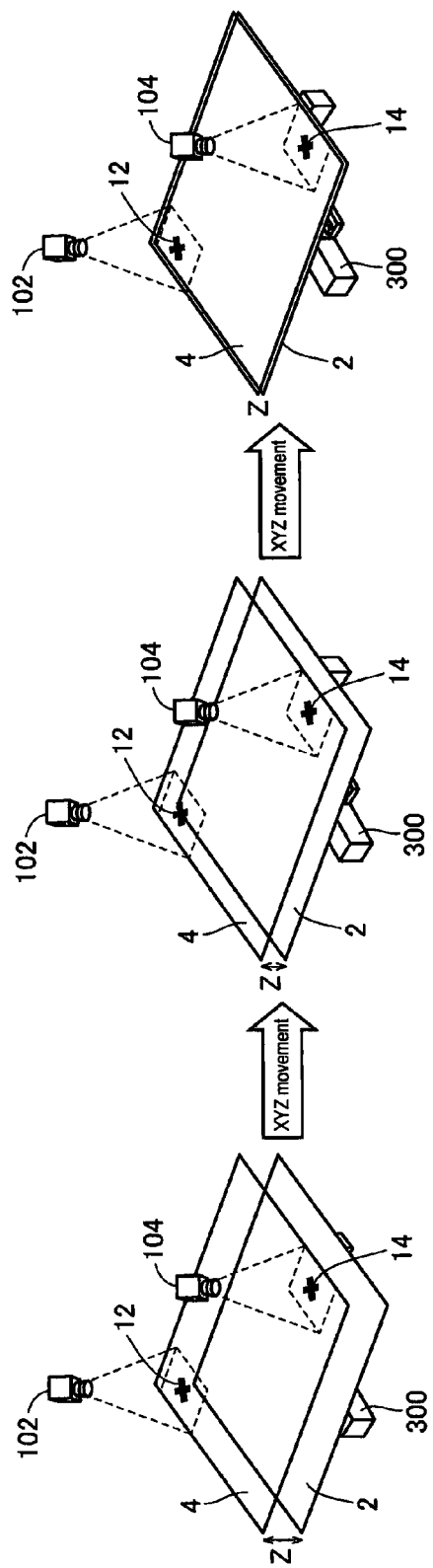
FIG. 23 is a schematic view for describing an application example according to a second modification of the embodiment.
Figure 24:
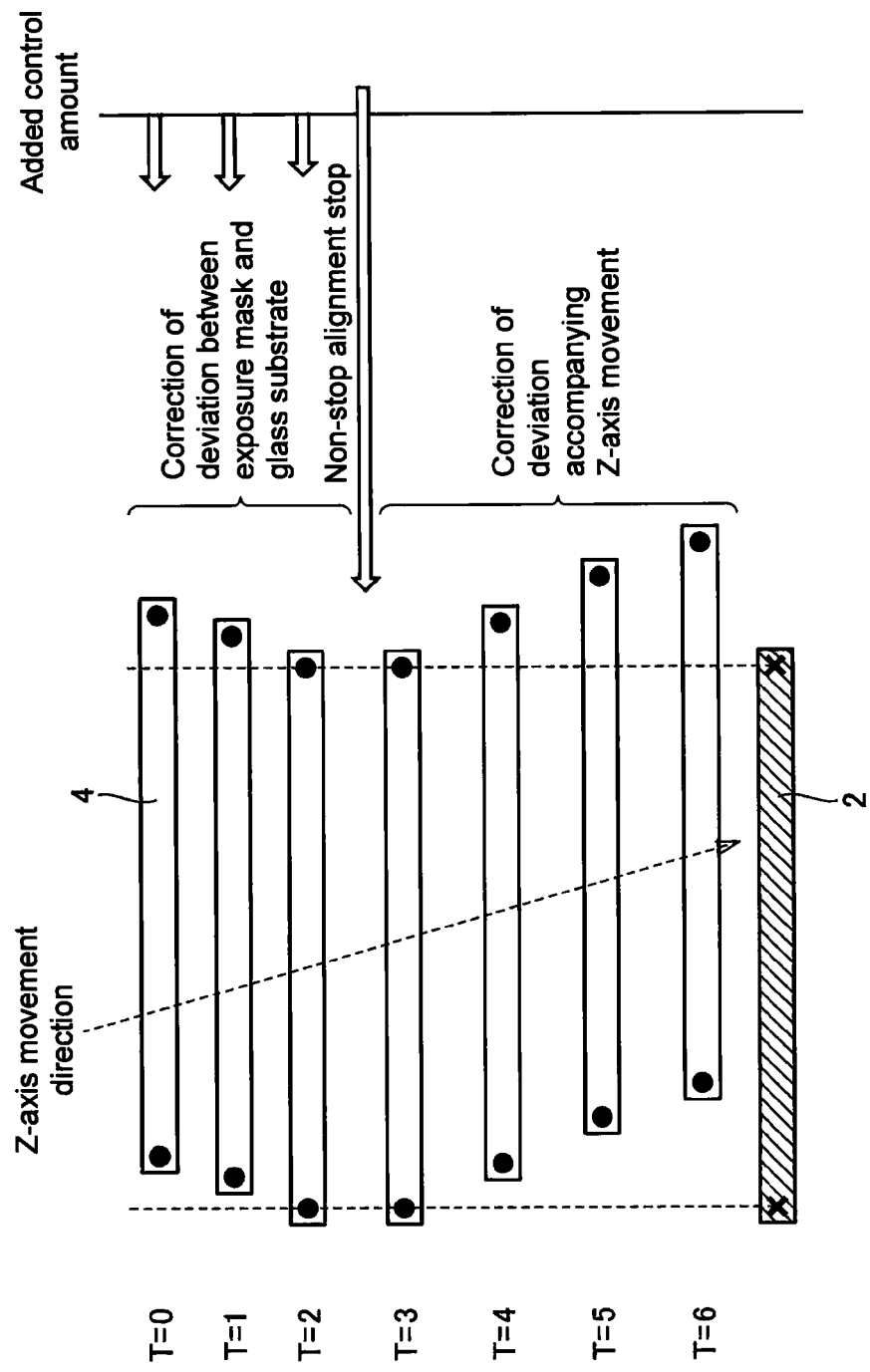
FIG. 24 is a diagram for describing a correcting process in the application example illustrated in FIG. 23.

FIG. 23 is a schematic view for describing an application example according to a second modification of the embodiment. FIG. 24 is a diagram for describing a correcting process in the application example illustrated in FIG. 23.

Referring to FIG. 23, for example, in a process of adhering exposure mask 4 to glass substrate 2, the distance between exposure mask 4 and glass substrate 2 is gradually reduced while performing alignment. By the completion of the alignment, exposure mask 4 is closely adhered to glass substrate 2 disposed below.

In such a process, there is the case where an XY stage of moving in the horizontal direction (XY plane) and the Z-axis stage moving in the vertical direction (Z axis) are disposed independently of each other. Specifically, the stage as the moving mechanism has another movable coordinate system in addition to a coordinate system positioned according to the first and second control operations (normal alignment and non-stop alignment). In such a case, the Z-axis stage is not perpendicular to the XY stage. In such a case, the following problem may occur.

Referring to FIG. 24, the XY stage and the Z-axis stage are simultaneously controlled. Basically, the non-stop alignment is executed for the XY plane. Consequently, when the positioning in the XY plane is completed, the non-stop alignment may be completed regardless of the fact that movement in the Z-axis direction continues.

That is, an object to be positioned in the non-stop alignment is the XY plane. When the positional accuracy of the XY plane reaches required accuracy during the movement of the Z axis, the non-stop alignment is finished (time T2 in FIG. 24).

After completion of the non-stop alignment, due to a deviation between the stages as described above, a positional deviation may occur in the XY plane accompanying the Z-axis movement. FIG. 24 illustrates a state where the positional accuracy reaches the required accuracy, the non-stop alignment stops at time T=2, and a positional deviation occurs accompanying subsequent movement of the Z axis.

As a countermeasure against such a problem, preferably, a change amount in the XY plane accompanying movement of the Z axis is obtained in advance and is given as a correction value to the target location of the non-stop alignment. Specifically, the target location is corrected by the following equation.

$$X = X' + AZ$$

$$Y = Y' + BZ$$

Here, X and Y are coordinates before correction, X' and Y' are coordinates after correction, and Z is a movement amount in the Z-axis direction. The coefficients A and B are obtained in advance by calibration.

In the above equation, the correction amount is a value related to the movement amount in the Z-axis direction for the reason that, as illustrated in FIG. 24, the offset component from the target location needs to be dynamically changed by the Z position of exposure mask 4.

As described above, in the second modification of the embodiment, the configuration is employed in which the stage moves not only in the XY direction but also in the Z direction during alignment. In such a configuration, in the case where the Z axis is not perpendicular to the XY axes, the XY position is corrected during alignment by preliminarily calibrating the change amount in the XY direction accompanying the movement amount of the Z axis. That is, the control system according to the second modification of the embodiment corrects a control instruction in the second control operation (non-stop alignment) in accordance with an error which occurs when the moving mechanism (stage) moves in another coordinate system (Z axis).

By performing such a correction, the accuracy can be increased also in the case where alignment needs to be performed in the horizontal and vertical directions.

M. Advantages

In the alignment method according to the embodiment, switching is performed in the middle, between the method of control (a kind of feed forward control) of determining a motion related to movement to a target location by one imaging on a stationary workpiece, and moving the workpiece in accordance with the determined movement, and the method of control (a kind of feedback control) of sequentially adjusting movement speed and the movement amount by sequentially performing one or more imaging on a moving workpiece. By the switching, the time required for the alignment can be shortened.

At this time, by delaying the timing of switching the two control methods as much as possible, the time in which the feedback control method of low movement speed is executed can be minimized. By preliminarily measuring the maximum value of the error which may occur in the system, the timing to switch the two control methods is determined according to the maximum value of the error obtained by the measurement. That is, when the workpiece moves in the range of the error measured by the feed forward control method, the control method is switched at this timing.

As described above, in the alignment according to the embodiment, by combining the normal alignment and the non-stop alignment, the time required to position the workpiece to the target location is shortened.

Figure 25:
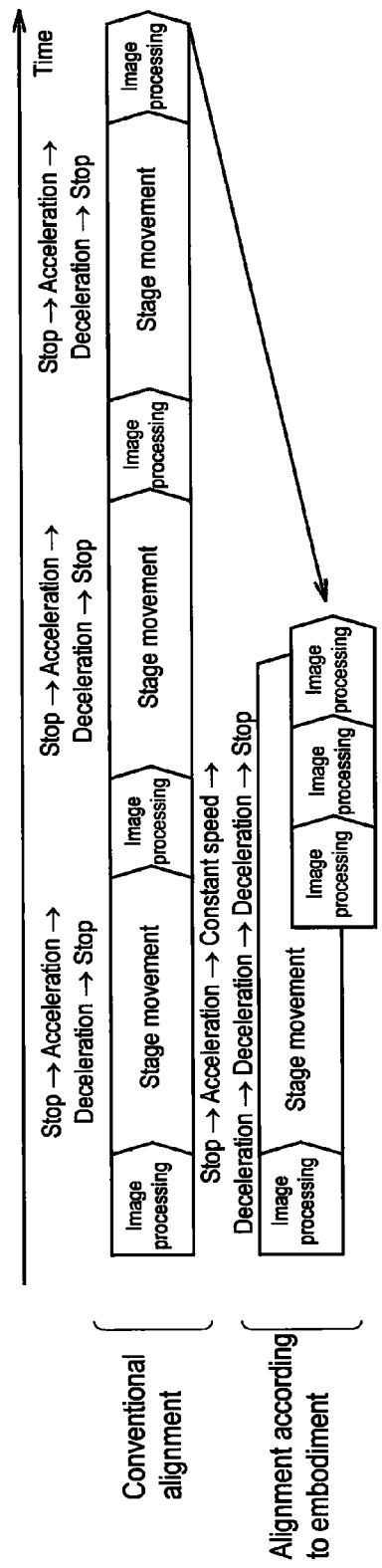
FIG. 25 is a diagram for describing an effect of shortening movement time by the alignment according to the embodiment.

FIG. 25 is a diagram for describing an effect of shortening movement time by the alignment according to the embodiment. FIG. 25 is a diagram in which the effect of shortening the time by the alignment according to the embodiment is compared with a conventional alignment. As illustrated in FIG. 25, in the embodiment, the positioning control is performed without stopping stage 300 (workpiece) which once started movement. Thus, there is no loss in time due to the stop, and the time required to complete the alignment can be greatly made shorter than that in the conventional alignment.

The embodiment disclosed herein is to be considered as illustrative and not restrictive in all aspects. The scope of the present invention is indicated by the scope of claims for patent rather than the foregoing description, and all changes within the meaning and range of equivalency of the claims are therefore intended to be embraced therein.

What is claimed is:

1. A control system comprising:
an image processing section configured to obtain image data obtained by imaging an object provided with a characteristic part for positioning and specify a position of the characteristic part comprised in the image data; and
a control section configured to position the object to a predetermined final target position by giving a control instruction based on the specified position of the characteristic part to a moving mechanism which changes the position of the object,
wherein the control system executes a first control operation, and then executes a second control operation, the control system switches the first control operation to the second control operation without stopping movement of the object,
in the first control operation, the image processing section obtains the image data and specifies the position of the characteristic part, the control section determines a control instruction for accelerating the object to a predetermined first speed based on the specified position of the characteristic part and then decelerating the object to a predetermined second speed lower than the first speed, to move the object to an intermediate target position away from the final target position by a predetermined margin distance,
in the second control operation, the image processing section obtains the image data during movement of the moving mechanism and specifies the position of the characteristic part, and the control section determines a control instruction for positioning the object to the final target position based on the specified position of the characteristic part, and
the margin distance is determined such that the object does not pass the final target position when the speed of the moving mechanism is decreased from the second speed at an allowable maximum acceleration.

2. The control system according to claim 1, wherein
in the second control operation, the control system repeatedly executes specification of the position of the characteristic part by the image processing section and determination of the control instruction for positioning the object to the final target position by the control section.

3. The control system according to claim 1, wherein
the margin distance is a sum of a first distance and a second distance, the first distance being determined by comparing a result obtained by the image processing section with the predetermined movement amount, the result obtained by specifying the position of the object after the moving mechanism's predetermined movement, and the second distance being a movement amount of the moving mechanism during a period in which the moving mechanism is moved at the second speed after the image processing section obtains image data and until the image processing section specifies the position of the characteristic part, and until the moving mechanism is decelerated from the second speed at the allowable maximum acceleration to be stopped.

4. The control system according to claim 1, wherein
the control instruction in the first control operation comprises an instruction of accelerating the moving mechanism at the allowable maximum acceleration.

5. The control system according to claim 1, wherein
in the second control operation, in a case where specification of the position of the characteristic part by the image processing section is not normal, the control section skips determination of the control instruction.

6. The control system according to claim 1, wherein
the image processing section is configured to obtain image data from first and second cameras comprising different visual field sizes from each other, and
the control section determines the control instruction used in the first control operation based on the image data of the first camera comprising a larger visual field size, and
in the first control operation, during movement of the moving mechanism, the control section switches the camera from which the image data is obtained from the first camera to the second camera comprising a smaller visual field size.

7. The control system according to claim 1, wherein
in the second control operation, in a case where specification of the position of the characteristic part is not normal, the image processing section skips determination of the control instruction.

8. The control system according to claim 1, wherein
the image processing section is configured to obtain image data from each of first and second cameras comprising different visual field sizes from each other,
the image processing section determines the control instruction used in the first control operation based on image data from the first camera comprising a larger visual field size, and
in the first control operation, during movement of the moving mechanism, the image processing section switches the camera from which the image data is obtained from the first camera to the second camera comprising a smaller visual field size.

9. The control system according to claim 1, wherein
the moving mechanism further comprises a different movable coordinate system in addition to a coordinate system positioned in accordance with the first and second control operations, and
the control section corrects a control instruction in the second control operation in accordance with an error which occurs when the moving mechanism moves in the different coordinate system.

10. A control method comprising:
obtaining image data obtained by imaging an object provided with a characteristic part for positioning and specifying a position of the characteristic part comprised in the image data; and
positioning the object to a predetermined final target position by giving a control instruction based on the specified position of the characteristic part to a moving mechanism which changes the position of the object,
wherein in the control method, a first control operation is executed, and then a second control operation is executed, the control method switches the first control operation to the second control operation without stopping movement of the object,
in the first control operation, after the step of obtaining the image data and specifying the position of the characteristic part is executed, the positioning step comprises a step of accelerating the object to a predetermined first speed based on the specified position of the characteristic part and then decelerating the object to a predetermined second speed lower than the first speed, to move the object to an intermediate target position away from the final target position by a predetermined margin distance, in the second control operation, after executing the step of obtaining the image data during movement of the moving mechanism and specifying the position of the characteristic part, the positioning step comprises a step of positioning the object to the final target position based on the specified position of the characteristic part, and the margin distance is determined such that the object does not pass the final target position when the speed of the moving mechanism is decreased from the second speed at an allowable maximum acceleration.

11. The control method according to claim 10, wherein positioning the object to a predetermined final target position comprises switching the first control operation to the second control operation when a distance between the object and a target location becomes equal to or less than a distance according to an error which occurs in a position specified from the image data, and the control method further comprises:

moving the moving mechanism by a predetermined movement amount;

specifying a position from image data obtained by imaging the position of the object after the movement; and moving the moving mechanism a plurality of times and determining a distance according to the error in accordance with comparison between the predetermined movement amount and the specified position of the object.

12. The control system according to claim 1, wherein the control system executes a position measurement operation in which the image processing section obtains the image data and specifies the position of the characteristic part and calculates the difference to the intermediate target position, and the control system executes the position measurement operation before execution of the first control operation.

13. The control method according to claim 10, wherein in the control method, a position measurement operation is executed in which the image processing section obtains the image data and specifies the position of the characteristic part and calculates the difference to the intermediate target position, and in the control method, the position measurement operation is executed before execution of the first control operation.

* * * * *